United States Patent
Komura et al.

(10) Patent No.: US 12,325,805 B2
(45) Date of Patent: Jun. 10, 2025

(54) COATING COMPOSITION AND IN-MOLD COATING METHOD

(71) Applicant: KANSAI PAINT CO., LTD., Hyogo (JP)

(72) Inventors: Katsuto Komura, Kanagawa (JP); Yukihiro Nemoto, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 187 days.

(21) Appl. No.: 17/917,847

(22) PCT Filed: Mar. 29, 2021

(86) PCT No.: PCT/JP2021/013402
§ 371 (c)(1),
(2) Date: Oct. 7, 2022

(87) PCT Pub. No.: WO2021/205934
PCT Pub. Date: Oct. 14, 2021

(65) Prior Publication Data
US 2023/0159788 A1     May 25, 2023

(30) Foreign Application Priority Data
Apr. 10, 2020   (JP) ................................. 2020-070905

(51) Int. Cl.
| | | |
|---|---|---|
| C09D 175/12 | (2006.01) | |
| C08G 18/28 | (2006.01) | |
| C08G 18/36 | (2006.01) | |
| C08G 18/42 | (2006.01) | |
| C08G 18/66 | (2006.01) | |
| C08G 18/73 | (2006.01) | |
| C08K 5/098 | (2006.01) | |
| C08K 5/101 | (2006.01) | |
| C09D 5/00 | (2006.01) | |
| C09D 7/63 | (2018.01) | |
| B29C 33/60 | (2006.01) | |
| B29C 45/16 | (2006.01) | |
| B29K 75/00 | (2006.01) | |

(52) U.S. Cl.
CPC ....... *C09D 175/12* (2013.01); *C08G 18/2825* (2013.01); *C08G 18/2865* (2013.01); *C08G 18/36* (2013.01); *C08G 18/42* (2013.01); *C08G 18/6662* (2013.01); *C08G 18/73* (2013.01); *C08K 5/098* (2013.01); *C08K 5/101* (2013.01); *C09D 5/00* (2013.01); *C09D 7/63* (2018.01); *B29C 33/60* (2013.01); *B29C 45/1679* (2013.01); *B29K 2075/00* (2013.01)

(58) Field of Classification Search
CPC .. C08G 18/329; C08G 18/6662; C08G 18/36; C08G 18/42; C09D 175/04; C09D 175/08; C08K 5/101; C08K 5/098
See application file for complete search history.

(56) References Cited

U.S. PATENT DOCUMENTS

2020/0061875 A1    2/2020   Lorenzo et al.

FOREIGN PATENT DOCUMENTS

| CN | 106478919 A | * | 3/2017 |
|---|---|---|---|
| JP | H09-194563 A | | 7/1997 |
| JP | 2000-281940 A | | 10/2000 |
| JP | 2017-066371 A | | 4/2017 |
| JP | 2017-113689 A | | 6/2017 |
| JP | 2017-534477 A | | 11/2017 |
| WO | WO 2016/028568 A | | 2/2016 |

OTHER PUBLICATIONS

Anyang General Chemical Website for Irgacure 2959 captured on Nov. 12, 2019 (Year: 2019).*
Wikipedia website for Binol captured on Nov. 6, 2020 (Year: 2020).*
International Application No. PCT/JP2021/013402, International Search Report and Written Opinion, mailed Jun. 8, 2021.

* cited by examiner

*Primary Examiner* — Mark S Kaucher
(74) *Attorney, Agent, or Firm* — MARSHALL, GERSTEIN & BORUN LLP

(57) ABSTRACT

The present invention provides a coating composition which is capable of forming a coating film that has excellent adhesion to a base material. The coating composition contains: an isocyanate-reactive group-containing resin (A); a polyisocyanate compound (B); and a hydroxyl group-containing aromatic compound (C) having a number average molecular mass of 100-1,000. The isocyanate-reactive group-containing resin (A) in the coating composition contains at least one type of resin selected from a hydroxyl group-containing resin (A1) and an amino group-containing resin (A2).

7 Claims, No Drawings

COATING COMPOSITION AND IN-MOLD COATING METHOD

CROSS REFERENCE TO RELATED APPLICATIONS

This application is a U.S. national stage of International Application No. PCT/JP2021/013402, filed Mar. 29, 2021, which claims the benefit of Japanese Patent Application No. 2020-070905, filed Apr. 10, 2020, the entire contents of each of which are fully incorporated herein by reference.

FIELD

The present invention relates to a coating composition and to an in-mold coating method.

BACKGROUND

In order to impart excellent outer appearance and performance to base material surfaces, a coating composition is applied onto the base material surface and the wet coating film formed over it is cured to form a coating film. In recent years there has been increased demand for reducing volatile organic compounds (VOC) in coating compositions and for lowering air-conditioning energy during coating, from the viewpoint of reducing environmental load. Because volatile organic solvents usually perform a role of reducing coating material viscosity, it is necessary to lower the viscosity in order to reduce VOCs in coating materials.

Automobile bodies generally have metal materials forming the body and resin materials forming the bumpers, etc. With the increasing strength of resin materials in recent years, however, there has been a trend toward switching from metal materials to lighter-weight resin materials at locations where metal materials were previously used.

A number of methods exist for coating onto resin materials, one being the method of in-mold coating. In-mold coating is a coating method in which, after a resin material has been molded in a mold, a coating material is injected between the molded article and the inner wall of the mold and the coating material is hardened, after which the molded article covered with the coating film is removed out of the mold. The process from application to curing in this coating method is carried out in a closed system. A virtually solvent-free environment is needed in order to avoid problems in the coating film, such as air bubbles.

Adhesiveness between coating films and base materials are required for applications in the field of automobiles.

PTL 1 discloses a method for in-mold coating which includes (a) a step of molding a plastic board through the first molding hole of a mold having at least two holes to form a molded plastic board, (b) a step of introducing the molded plastic board into the second molding hole of the mold, (c) a step of introducing a coating composition including (i) a polymer with an isocyanate reactive group and (ii) a polyisocyanate into the second molding hole that contains the molded plastic board, (d) a step of curing the coating composition in the second molding hole under specified curing conditions, and (e) a step of opening the molding hole to allow the coated molded board to be released from the second molding hole either by gravity alone or by suction force alone. It is stated that this method provides an excellent mold release property when the coated molded board is removed from the mold.

CITATION LIST

Patent Literature

[PTL 1] JP 2017-534477 A

SUMMARY

Technical Problem

The technology described in PTL 1 has been inadequate in terms of adhesiveness of the coating film for the base material.

It is an object of the present invention to provide a coating composition that allows formation of a coating film with excellent adhesiveness for base materials.

Solution to Problem

As a result of much avid research with the goal of achieving the object stated above, the present inventors have found that the object can be achieved by a coating composition that includes: an isocyanate reactive group-containing resin (A); a polyisocyanate compound (B); and a hydroxy group-containing aromatic compound (C) having a number-average molecular weight in the range of 100 to 1000.

Specifically, the invention relates to the following <1> to <8>.

<1> A coating composition comprising: an isocyanate reactive group-containing resin (A); a polyisocyanate compound (B); and a hydroxy group-containing aromatic compound (C) having a number-average molecular weight in the range of 100 to 1000.

<2> The coating composition according to <1>, wherein the isocyanate reactive group-containing resin (A) comprises one or more resins selected from among hydroxy group-containing resins (A1) and amino group-containing resins (A2).

<3> The coating composition according to <1> or <2>, wherein the number-average molecular weight of the hydroxy group-containing aromatic compound (C) is in the range of 140 to 900.

<4> The coating composition according to any one of <1> to <3>, wherein the hydroxy group-containing aromatic compound (C) has one hydroxy group.

<5> The coating composition according to any one of <1> to <4>, wherein the hydroxy group-containing aromatic compound (C) has 2 to 4 aromatic ring structures.

<6> The coating composition according to any one of <1> to <5>, wherein the solid content of the coating composition is 95 mass % or greater.

<7> The coating composition according to any one of <1> to <6>, which further includes an internal mold release agent (D).

<8> An in-mold coating method that includes a step of heating and molding a resin material in a mold, subsequently injecting an in-mold coating composition between the obtained molded article and the mold inner wall and curing the in-mold coating composition, and then removing the coated molded article from the mold, wherein the in-mold coating composition is a coating composition according to any one of <1> to <7>.

Advantageous Effects of Invention

According to the invention it is possible to provide a coating composition that allows formation of a coating film with excellent adhesiveness for base materials.

DESCRIPTION OF EMBODIMENTS

The present invention will now be described in greater detail using examples of a preferred embodiment, with the understanding that the invention is not restricted to the content described.

[Coating Composition]

The coating composition of the invention includes an isocyanate reactive group-containing resin (A), a polyisocyanate compound (B) and a hydroxy group-containing aromatic compound (C) having a number-average molecular weight in the range of 100 to 1000.

[Isocyanate Reactive Group-Containing Resin (A)]

The isocyanate reactive group-containing resin (A) is a resin having at least one isocyanate reactive group in the molecule.

The isocyanate reactive group is not particularly restricted so long as it is a group that is reactive with isocyanate groups. Examples of isocyanate reactive groups include hydroxyl, amino, carboxyl and thiol groups, with hydroxyl and amino groups being preferred from the viewpoint of adhesiveness between the formed coating film and the base material, and gloss of the formed coating film. The isocyanate reactive group-containing resin (A) therefore preferably comprises one or more resins selected from among hydroxy group-containing resins (A1) and amino group-containing resins (A2).

The isocyanate reactive group-containing resin (A) preferably comprises a hydroxy group-containing resin (A1) from the viewpoint of improving the popping resistance of the coating composition that is obtained.

The isocyanate reactive group-containing resin (A) preferably comprises an amino group-containing resin (A2) from the viewpoint of reducing the viscosity of the coating composition that is obtained.

[Hydroxy Group-Containing Resin (A1)]

The hydroxy group-containing resin (A1) is a resin having at least one hydroxy group in the molecule. Examples for the hydroxy group-containing resin (A1) include resins such as polyester resins, acrylic resins, acryl-modified polyester resins, polyurethane resins, polyether resins, polycarbonate resins, epoxy resins and alkyd resins, which have hydroxy groups. These may be used alone or in combinations of two or more. The hydroxy group-containing resin (A1) is also preferably a hydroxy group-containing polyester resin from the viewpoint of curability and viscosity reduction of the obtained coating composition.

[Hydroxy Group-Containing Polyester Resin]

A hydroxy group-containing polyester resin can generally be produced by esterification reaction or transesterification reaction between an acid component and an alcohol component.

The acid component used may be a compound that is commonly used as a polycarboxylic acid for production of the hydroxy group-containing polyester resin. Examples of such polycarboxylic acids include aliphatic polybasic acids, alicyclic polybasic acids and aromatic polybasic acids.

The aliphatic polybasic acid will generally be an aliphatic compound having two or more carboxyl groups in the molecule, an acid anhydride of such an aliphatic compound, or an ester of such an aliphatic compound. Examples for aliphatic polybasic acids include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid and butanetetracarboxylic acid; anhydrides of such aliphatic polybasic carboxylic acids; and C1-6 and preferably C1-4 lower alkyl esterified products of such aliphatic polybasic carboxylic acids. The aliphatic polybasic acid used may be any one type or a combination of two or more types.

The alicyclic polybasic acid will generally be a compound having one or more alicyclic structures and two or more carboxyl groups in the molecule, or an acid anhydride of such a compound or an esterified form of such a compound. An alicyclic structure may be primarily a 4- to 6-membered cyclic structure. Examples of alicyclic polybasic acids include alicyclic polybasic carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of these alicyclic polybasic carboxylic acids; and C1-6 and preferably C1-4 lower alkyl esterified products of these alicyclic polybasic carboxylic acids. The alicyclic polybasic acid used may be any one type or a combination of two or more types.

The aromatic polybasic acid will generally be an aromatic compound having two or more carboxyl groups in the molecule, an acid anhydride of such an aromatic compound, or an ester of such an aromatic compound. Examples of aromatic polybasic acids include aromatic polybasic carboxylic acids such as phthalic acid, isophthalic acid, terephthalic acid, naphthalenedicarboxylic acid, 4,4'-biphenyldicarboxylic acid, trimellitic acid and pyromellitic acid; anhydrides of these aromatic polybasic carboxylic acids; and C1-6 and preferably C1-4 lower alkyl esterified products of these aromatic polybasic carboxylic acids. The aromatic polybasic acid used may be any one type or a combination of two or more types.

Acid components other than the aforementioned aliphatic polybasic acids, alicyclic polybasic acids and aromatic polybasic acids may also be used. Such acid components are not particularly restricted, and examples include fatty acids such as coconut fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid. Any of these acid components may be used either alone or in combinations of two or more.

As the alcohol component there may be suitably used a polyhydric alcohol having two or more hydroxy groups in the molecule. Examples of polyhydric alcohols include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, neopentyl glycol hydroxypivalate ester, hydrogenated bisphenol A, hydrogenated bisphenol F and dimethylolpropionic acid; polylactone diols with lactone compounds such as ε-caprolactone added to these dihydric alcohols; ester diol compounds such as bis(hydroxyethyl) terephthalate; polyether diol compounds such as bisphenol A alkylene oxide addition products, polyethylene glycol, polypropylene glycol and polybutylene glycol; trihydric and greater alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol and mannitol; polylactone polyol compounds with lactone compounds such as ε-caprolactone added to these trihydric and greater alcohols; and fatty acid esterified glycerin.

Alcohol components other than the aforementioned polyols may also be used. Such alcohol components are not particularly restricted, and examples include monoalcohols such as methanol, ethanol, propyl alcohol, butyl alcohol, stearyl alcohol and 2-phenoxyethanol; and alcohol compounds obtained by reacting acids with monoepoxy compounds such as propylene oxide, butylene oxide, "CARDURA E10" (trade name of Hexion, glycidyl ester of synthetic highly-branched saturated fatty acid), and the like.

The method for producing the hydroxy group-containing polyester resin is not particularly restricted, and it may be a common method. For example, a hydroxy group-containing polyester polyol resin can be produced by a method of heating the acid component and the alcohol component under a nitrogen stream at about 150 to 250° C. for about 5 to 10 hours, for esterification reaction or transesterification reaction between the acid component and alcohol component.

When the acid component and alcohol component are subjected to esterification reaction or transesterification reaction, the components may be added all at once to the reactor, or one or both may be added in separate portions. Alternatively, after the hydroxy group-containing polyester resin has first been synthesized, an acid anhydride may be reacted with the obtained hydroxy group-containing polyester resin for half-esterification, to obtain a carboxyl group- and hydroxy group-containing polyester resin. Also alternatively, after a carboxyl group-containing polyester resin has first been synthesized, the alcohol component may be added to produce a hydroxy group-containing polyester resin.

During the esterification or transesterification reaction, a known catalyst such as dibutyltin oxide, antimony trioxide, zinc acetate, manganese acetate, cobalt acetate, calcium acetate, lead acetate, tetrabutyl titanate or tetraisopropyl titanate may be used as a catalyst for acceleration of the reaction.

Also, the hydroxy group-containing polyester resin may be modified with a fatty acid, monoepoxy compound, polyisocyanate compound or the like either during or after production of the resin.

Examples as fatty acids that may be suitably used include coconut fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid and safflower oil fatty acid, and a preferred example for the monoepoxy compound is "CARDURA E10P" (trade name of Hexion, glycidyl ester of synthetic highly-branched saturated fatty acid).

Examples for the polyisocyanate compound include organic polyisocyanates, such as aliphatic diisocyanate compounds such as lysine diisocyanate, hexamethylene diisocyanate and trimethylhexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylenebis(cyclohexylisocyanate) and 1,3-(isocyanatomethyl)cyclohexane; aromatic diisocyanate compounds such as tolylene diisocyanate, xylylene diisocyanate and diphenylmethane diisocyanate; and trivalent and greater polyisocyanates such as lysine triisocyanate; as well as addition products of these organic polyisocyanates with polyhydric alcohols, low molecular weight polyester resins, water or the like; cyclized polymers formed between these organic polyisocyanates (for example, isocyanurates) and biuret-type addition products. These polyisocyanate compounds may be used alone or in mixtures of two or more.

From the viewpoint of curability of the obtained coating composition and adhesiveness between the coating film and base material, the hydroxy group-containing polyester resin preferably has a hydroxyl value in the range of 1 to 600 mgKOH/g, especially 100 to 550 mgKOH/g and most especially 300 to 540 mgKOH/g.

From the viewpoint of viscosity reduction of the obtained coating composition, improved popping resistance, hardness of the coating film that is formed and adhesiveness between the coating film and base material, the hydroxy group-containing polyester resin also preferably has a number-average molecular weight in the range of 100 to 10,000, especially 200 to 5,000 and most especially 250 to 2,000.

From the viewpoint of viscosity reduction of the obtained coating composition, improved popping resistance, hardness of the coating film that is formed and adhesiveness between the coating film and base material, the hydroxy group-containing polyester resin also preferably has a glass transition temperature (Tg) in the range of −80° C. to 5° C., especially −70° C. to 3° C. and most especially −60° C. to 0° C.

Throughout the present specification, the number-average molecular weight and weight-average molecular weight of a substance of known chemical formula is the molecular weight as calculated from the chemical formula.

The number-average molecular weight and weight-average molecular weight of a substance of unknown chemical formula is the value of the retention time (retention volume) measured using gel permeation chromatography (GPC), converted to the molecular weight of polystyrene based on the retention time (retention volume) of standard polystyrene of known molecular weight measured under the same conditions. Specifically, it may be measured using "HLC-8120GPC" (trade name of Tosoh Corp.) as the gel permeation chromatograph, using 4 columns, a "TSKgel G4000HXL", "TSKgel G3000HXL", "TSKgel G2500HXL" and "TSKgel G2000XL" (all trade names of Tosoh Corp.) as the columns, and using a differential refractometer as the detector, under the conditions of mobile phase: tetrahydrofuran, measuring temperature: 40° C., flow rate: 1 mL/min.

The glass transition temperature can be measured using a "DSC-50Q" differential scanning calorimeter (trade name of Shimadzu Corp.), for example, by taking a sample into a measuring cup, subjecting it to vacuum suction to completely remove the solvent, and then measuring the change in heat quantity in a range of −100° C. to 150° C. at a temperature-elevating rate of 3° C./min and recording the static glass transition temperature as the change point of the original baseline at the low-temperature end.

[Hydroxy Group-Containing Acrylic Resin]

The hydroxy group-containing acrylic resin can be produced, for example, by copolymerizing a hydroxy group-containing polymerizable unsaturated monomer and another polymerizable unsaturated monomer that is copolymerizable with the hydroxy group-containing polymerizable unsaturated monomer, by a known method such as a solution polymerization method in an organic solvent or an emulsion polymerization method in water.

The hydroxy group-containing polymerizable unsaturated monomer is a compound having one or more hydroxy groups and polymerizable unsaturated bonds in the molecule. Specific examples for the hydroxy group-containing polymerizable unsaturated monomer include monoesterified products of (meth)acrylic acid and dihydric alcohols of 2 to 8 carbon atoms, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of the monoesterified products of (meth)acrylic acid and dihydric alcohols of 2 to 8 carbon atoms; N-hydroxymethyl (meth)acrylamide; and allyl alcohols; as well as (meth)acrylates having polyoxyethylene chains with hydroxy groups at the molecular ends.

However, monomers qualifying as (xvii) polymerizable unsaturated monomers with an ultraviolet absorbing functional group as mentioned below are to be defined as other polymerizable unsaturated monomers that are copolymerizable with hydroxy group-containing polymerizable unsaturated monomers, and are excluded from hydroxy group-containing polymerizable unsaturated monomers for the invention. These may be used either alone or in combinations of two or more.

Examples of other polymerizable unsaturated monomers that are copolymerizable with the hydroxy group-containing polymerizable unsaturated monomer and that may be used include the following monomers (i) to (xx). These polymerizable unsaturated monomers may be used alone or in combinations of two or more.

(i) Alkyl or cycloalkyl (meth)acrylates: For example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate and the like.

(ii) Polymerizable unsaturated monomers with isobornyl groups: Monomers such as isobornyl (meth)acrylate.

(iii) Polymerizable unsaturated monomers with adamantyl groups: Adamantyl (meth)acrylate and the like.

(iv) Polymerizable unsaturated monomers with tricyclodecenyl groups: Tricyclodecenyl (meth)acrylate and the like.

(v) Aromatic ring-containing polymerizable unsaturated monomers: Monomers such as benzyl (meth)acrylate, styrene, α-methylstyrene and vinyltoluene.

(vi) Polymerizable unsaturated monomers with alkoxysilyl groups: Monomers such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane.

(vii) Polymerizable unsaturated monomers with fluorinated alkyl groups: Perfluoroalkyl (meth)acrylates such as perfluorobutylethyl (meth)acrylate and perfluorooctylethyl (meth)acrylate, and fluoroolefins and the like.

(viii) Polymerizable unsaturated monomers with photopolymerizable functional groups such as maleimide.

(ix) Vinyl compounds: N-Vinylpyrrolidone, ethylene, butadiene, chloroprene, vinyl propionate, vinyl acetate and the like.

(x) Carboxyl group-containing polymerizable unsaturated monomers: Monomers such as (meth)acrylic acid, maleic acid, crotonic acid and β-carboxyethyl (meth)acrylate.

(xi) Nitrogen-containing polymerizable unsaturated monomers: (Meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis(meth)acrylamide, ethylenebis(meth)acrylamide, and glycidyl (meth)acrylate and amine compound addition products and the like.

(xii) Polymerizable unsaturated monomers with two or more polymerizable unsaturated groups in the molecule: Monomers such as allyl (meth)acrylate, ethylene glycol di(meth)acrylate, 1,4-butanediol di(meth)acrylate, neopentyl glycol di(meth)acrylate and 1,6-hexanediol di(meth)acrylate.

(xiii) Epoxy group-containing polymerizable unsaturated monomers: Monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether.

(xiv) (Meth)acrylates having polyoxyethylene chains with alkoxy groups at the molecular ends.

(xv) Polymerizable unsaturated monomers with sulfonic acid groups: Monomers such as 2-acrylamide-2-methylpropanesulfonic acid, 2-sulfoethyl (meth)acrylate, allylsulfonic acid and 4-styrenesulfonic acid; and sodium salts and ammonium salts of these sulfonic acids.

(xvi) Polymerizable unsaturated monomers with phosphate groups: Acid phosphooxyethyl (meth)acrylate, acid phosphooxypropyl (meth)acrylate, acid phosphooxypoly(oxyethylene)glycol (meth)acrylate, acid phosphooxypoly(oxypropylene)glycol (meth)acrylate, and the like.

(xvii) Polymerizable unsaturated monomers with ultraviolet absorbing functional groups: 2-Hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole and the like.

(xviii) Light-stable polymerizable unsaturated monomers: Monomers such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine.

(xix) Polymerizable unsaturated monomers with carbonyl groups: Monomers such as acrolein, diacetoneacrylamide, diacetonemethacrylamide, acetoacetoxyethyl methacrylate, formylstyrol and vinylalkyl ketones with 4 to 7 carbon atoms (for example, vinylmethyl ketone, vinylethyl ketone and vinylbutyl ketone).

(xx) Polymerizable unsaturated monomers with acid anhydride groups: Monomers such as maleic anhydride, itaconic anhydride and citraconic anhydride.

As used herein, "polymerizable unsaturated group" means an unsaturated group that can participate in radical polymerization. Examples of polymerizable unsaturated groups include vinyl, (meth)acryloyl, (meth)acrylamide, vinyl ether, allyl, propenyl, isopropenyl and maleimide groups.

Also, as used herein, "(meth)acrylate" refers to acrylate or methacrylate. The term "(meth)acrylic acid" refers to acrylic acid or methacrylic acid. The term "(meth)acryloyl" refers to acryloyl or methacryloyl. The term "(meth)acrylamide" refers to acrylamide or methacrylamide.

From the viewpoint of curability of the obtained coating composition and adhesiveness between the coating film and base material, the hydroxyl value of the hydroxy group-containing acrylic resin is preferably in the range of 5 to 240 mgKOH/g, especially 20 to 220 mgKOH/g and most especially 15 to 200 mgKOH/g.

From the viewpoint of viscosity reduction of the obtained coating composition, improved popping resistance, hardness of the coating film that is formed and adhesiveness between the coating film and base material, the weight-average molecular weight of the hydroxy group-containing acrylic resin is preferably in the range of 500 to 50,000, especially 1,000 to 30,000 and most especially 1,500 to 10,000.

From the viewpoint of viscosity reduction of the obtained coating composition and hardness of the coating film that is formed, the glass transition temperature (Tg) of the hydroxy group-containing acrylic resin is preferably in the range of −40 to 60° C., especially −35 to 50° C. and most especially −30 to 40° C.

Throughout the present specification, when the resin with an isocyanate reactive group (A) is a hydroxy group-containing acrylic resin, the glass transition temperature (Tg) of the hydroxy group-containing acrylic resin is the value calculated by the following formula:

$$1/Tg(K) = W1/T1 + W2/T2 + \ldots Wn/Tn$$

$$Tg(°\text{C.}) = Tg(K) - 273$$

In the formula, W1, W2, . . . Wn represents the mass fraction of each of the monomers, and T1, T2 . . . Tn represents the glass transition temperature Tg (K) of homopolymers of each of the monomers.

The glass transition temperature of the homopolymer of each monomer is the value according to POLYMER HANDBOOK Fourth Edition, J. Brandrup, E. H. Immergut, E. A. Grulke, ed. (1999), and the glass transition temperatures of monomers not listed in this publication are the static glass transition temperatures measured by synthesizing a homopolymer of the monomer to a weight-average molecular weight of about 50,000.

The static glass transition temperature can be measured using a "DSC-50Q" differential scanning calorimeter (trade name of Shimadzu Corp.), for example, by taking a sample into a measuring cup, subjecting it to vacuum suction to completely remove the solvent, and then measuring the change in heat quantity in a range of −100° C. to 150° C. at a temperature-elevating rate of 3° C./min and recording the static glass transition temperature as the change point of the original baseline at the low-temperature end.

[Hydroxy Group-Containing Polyurethane Resin]

A hydroxy group-containing polyurethane resin may be used as the hydroxy group-containing resin (A1) in the coating composition of the invention.

The hydroxy group-containing polyurethane resin may be obtained by reacting a polyol compound and a polyisocyanate compound by a known method.

The polyol compound is preferably one having at least 2 alcoholic hydroxy groups in the molecule, having a number-average molecular weight in the range of about 50 to 8,000 and especially about 50 to 6,000, and having hydroxyl equivalents in the range of about 25 to 4,000 and especially about 25 to 3,000.

Examples of polyol compounds include polyhydric alcohols, polyester polyols, polyether polyols, polycarbonate polyols, and mixtures of the same.

The polyisocyanate compound is a compound with at least two isocyanate groups in the molecule, and examples include aliphatic polyisocyanates, alicyclic polyisocyanates, araliphatic polyisocyanates, aromatic polyisocyanates, and derivatives of these polyisocyanates.

The polyisocyanate compound used may be any of the polyisocyanate compounds mentioned below for explanation of the polyisocyanate compound (B).

[Amino Group-Containing Resin (A2)]

The amino group-containing resin (A2) used may be a conventionally known compound having at least one amino group in the molecule.

Multiple amino groups in the amino group-containing resin (A2) may be one or more selected from among primary amino groups and secondary amino groups, and the amino group-containing resin (A2) is most preferably a compound having a secondary amino group as an amino group.

Aspartic ester amines are suitable examples to be used for the amino group-containing resin (A2) of the invention.

Examples of commercially available aspartic ester amines include Desmophen NH 1220, Desmophen NH1420 and Desmophen NH 1520 (all trade names of Covestro AG).

[Polyisocyanate Compound (B)]

The polyisocyanate compound (B) is a compound with at least two isocyanate groups in the molecule, and examples include aliphatic polyisocyanates, alicyclic polyisocyanates, araliphatic polyisocyanates, aromatic polyisocyanates, and derivatives of these polyisocyanates.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or its mixtures, and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of araliphatic polyisocyanates include araliphatic diisocyanates such as 1,3- or 1,4-xylylene diisocyanate or mixtures thereof, of, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and araliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or their mixtures, 2,4- or 2,6-tolylene diisocyanate or their mixtures, 4,4'-toluidine diisocyanate and 4,4'-diphenyl ether diisocyanate; aromatic triisocyanates such as triphenylmethane-4,4',4''-triisocyanate, 1,3,5-triisocyanatobenzene, 2,4,6-triisocyanatotoluene; and aromatic tetraisocyanates such as 4,4'-diphenylmethane-2,2',5,5'-tetraisocyanate.

Examples of the aforementioned polyisocyanate derivatives include the aforementioned polyisocyanate dimers, trimers, biurets, allophanates, urethodiones, urethoimines, isocyanurates, oxadiazinetriones and the like, as well as polymethylenepolyphenyl polyisocyanate (crude MDI, polymeric MDI) and crude TDI.

These polyisocyanates and their derivatives may be used alone or in combinations of two or more. Among these polyisocyanates, it is preferred to use aliphatic diisocyanates, alicyclic diisocyanates and derivatives of the foregoing, either alone or in combinations of two or more.

Also, the polyisocyanate compound (B) that is used may be a prepolymer obtained by reacting any of the aforementioned polyisocyanates or their derivatives with a compound that can react with the polyisocyanate, under conditions with an excess of isocyanate groups. Compounds that can react with the aforementioned polyisocyanates include compounds with active hydrogen groups such as hydroxyl and amino, and specifically there may be used polyhydric alcohols, low molecular weight polyester resins, amines, water and the like.

The polyhydric alcohol used may be any of the polyhydric alcohols mentioned above for the hydroxy group-containing polyester resin.

From the viewpoint of adhesiveness between the formed coating film and base material and releasability between the formed coating film and mold, the polyisocyanate compound (B) is preferably used in a proportion such that the ratio of isocyanate groups in the polyisocyanate compound with respect to isocyanate reactive groups in the isocyanate reactive group-containing resin (A) is in the range of usually 0.5 to 2.0 and especially 0.7 to 1.5.

When a hydroxy group-containing resin (A1) is used as the isocyanate reactive group-containing resin (A), from the viewpoint of adhesiveness between the formed coating film and base material and releasability between the formed coating film and mold, the polyisocyanate compound (B) is preferably used in a proportion such that the ratio of isocyanate groups in the polyisocyanate compound with respect to hydroxy groups in the hydroxy group-containing resin (A1) (NCO/OH) is in the range of usually 0.5 to 2.0 and especially 0.7 to 1.5.

When an amino group-containing resin (A2) is used as the isocyanate reactive group-containing resin (A), from the viewpoint of adhesiveness between the formed coating film and base material and releasability between the formed coating film and mold, the polyisocyanate compound (B) is preferably used in a proportion such that the ratio of isocyanate groups in the polyisocyanate compound with respect to amino groups in the amino group-containing resin (A2) is in the range of usually 0.5 to 2.0 and especially 0.7 to 1.5.

[Hydroxy Group-Containing Aromatic Compound (C)]

The hydroxy group-containing aromatic compound (C) is a compound having a number-average molecular weight in the range of 100 to 1000, and at least one hydroxy group and at least one aromatic ring structure in the molecule.

From the viewpoint of increasing the solid content of the coating composition that is obtained, the number-average molecular weight of the hydroxy group-containing aromatic compound (C) is 100 or greater, preferably 140 or greater, more preferably 180 or greater and most preferably 500 or greater, and from the viewpoint of viscosity reduction of the obtained coating composition and adhesiveness between the formed coating film and base material, it is 1000 or lower, preferably 900 or lower, more preferably 800 or lower and most preferably 700 or lower.

Examples of aromatic ring structures include a benzene ring structure, furan ring structure, thiophene ring structure, pyrrole ring structure, pyrazole ring structure, imidazole ring structure, pyridine ring structure, pyridazine ring structure, pyrimidine ring structure, pyrazine ring structure, annulene ring structure or azulene ring structure. From the viewpoint of adhesiveness between the formed coating film and base material, the hydroxy group-containing aromatic compound (C) preferably has a benzene ring structure.

Examples for the hydroxy group-containing aromatic compound (C) include benzyl alcohol, 2-phenylethanol, 2-phenoxyethanol, naphthalene-1-ol, (1,3-benzooxole-5-yl)methanol, nonylphenol, dinonylphenol, nonylphenol ethoxylate, monostyrenated phenol, distyrenated phenol and tristyrenated phenol, with commercial products including "BPX-11", "BPX-33" and "BPX-55" (all bisphenol A propylene oxide adducts and trade names of Adeka Corp.), "KUMANOX-3110" and "KUMANOX-3111" (all styrenated phenols and trade names of Kumho Petrochemical Co., Ltd.), "ANTAGE SP" (styrenated phenol, trade name of Kawaguchi Chemical Industry Co., Ltd.) and "NOVARES LA 300" (styrenated phenol, trade name of Rutgers Germany Gmbh).

From the viewpoint of adhesiveness between the formed coating film and base material, the hydroxy group-containing aromatic compound (C) preferably has 1 to 3 hydroxy groups, while from the viewpoint of viscosity reduction of the obtained coating composition it more preferably has one hydroxy group.

From the viewpoint of adhesiveness between the formed coating film and base material and gloss of the formed coating film, the hydroxy group-containing aromatic compound (C) preferably has 1 to 4 aromatic ring structures, more preferably 2 to 4 aromatic ring structures and most preferably two aromatic ring structures.

Presumably, the reason why it is possible to form a coating film having excellent adhesiveness between base materials, and particularly resin base materials, using the coating composition of the invention that includes the isocyanate reactive group-containing resin (A), the polyisocyanate compound (B) and the hydroxy group-containing aromatic compound (C) with a number-average molecular weight in the range of 100 to 1000, is that when the coating composition of the invention is coated onto a resin base material, the hydroxy group-containing aromatic compound (C) which has a relatively low molecular weight and an aromatic ring structure with high affinity for the resin base material permeates into and swells the resin base material, while the hydroxy groups of the hydroxy group-containing aromatic compound (C), the isocyanate reactive groups of the isocyanate reactive group-containing resin (A) and the isocyanate groups of the polyisocyanate compound (B) undergo crosslinking reaction, thus firmly bonding the coating film with the resin base material and forming a coating film with excellent adhesiveness with the base material.

The content of the isocyanate reactive group-containing resin (A) for the purpose of the invention is preferably in the range of 15 to 80 mass %, more preferably in the range of 20 to 70 mass % and most preferably in the range of 25 to 60 mass % based on the total amount of the coating composition, from the viewpoint of adhesiveness between the formed coating film and base material and gloss of the formed coating film.

The content of the polyisocyanate compound (B) for the purpose of the invention is preferably in the range of 10 to 80 mass %, more preferably in the range of 20 to 75 mass % and most preferably in the range of 30 to 70 mass % based on the total amount of the coating composition, from the viewpoint of adhesiveness between the formed coating film and base material and hardness of the formed coating film.

The content of the hydroxy group-containing aromatic compound (C) for the purpose of the invention is preferably in the range of 0.1 to 25 mass %, more preferably in the range of 0.5 to 20 mass % and most preferably in the range of 0.8 to 15 mass % based on the total amount of the coating composition, from the viewpoint of viscosity reduction of the obtained coating composition, improved popping resistance, adhesiveness between the formed coating film and base material and hardness and gloss of the formed coating film.

[Internal Mold Release Agent (D)]

When the coating composition of the invention is applied by an in-mold coating method, it preferably comprises an internal mold release agent (D) from the viewpoint of releasability between the formed coating film and mold.

Examples for the internal mold release agent (D) include saturated fatty acids such as stearic acid and palmitic acid; saturated fatty acid salts such as zinc stearate, aluminum stearate, magnesium stearate, calcium stearate, sodium stearate, potassium stearate, barium stearate, zinc palmitate, aluminum palmitate, magnesium palmitate, calcium palmitate and sodium palmitate; fatty acid amides such as amide stearate and amide palmitate; unsaturated fatty acids such as palmitoleic acid and oleic acid; unsaturated fatty acid salts such as zinc palmitoleate, aluminum palmitoleate, magnesium palmitoleate, calcium palmitoleate, sodium palmitoleate, potassium palmitoleate, barium palmitoleate, zinc oleate, aluminum oleate, magnesium oleate, calcium oleate, sodium oleate, potassium oleate and barium oleate; unsaturated fatty acid amides such as amide palmitoleate and amide oleate; nonionic surfactants such as polyoxyethylene alkyl ethers and sorbitan alkyl esters; fluorine-based compounds such as polytetrafluoroethylene, fluoropolyethers, perfluoroalkyl esters and perfluoroalkyl ester salts; phosphoric acid ester compounds such as phosphoric acid monoesters and/or phosphoric acid diesters with alkyl chains or oxyethylene chains; fatty acid esters such as stearic acid monoglyceride, stearic acid diglyceride, stearic acid triglyceride, stearic acid monosorbitate, stearyl stearate, palmitic acid monoglyceride, palmitic acid diglyceride, palmitic acid triglyceride, behenic acid monoglyceride, behenic acid diglyceride, behenic acid triglyceride, behenyl behenate, pentaerythritol monostearate, pentaerythritol tetrastearate, pentaerythritol tetrapelargonate, propyleneglycol monostearate, stearyl stearate, palmityl palmitate, methyl stearate, butyl stearate, methyl laurate, methyl palmitate, isopropyl palmitate, biphenyl biphenate, sorbitan monostearate and 2-ethylhexyl stearate; and soybean oil lecithin, silicone oil or fatty acid alcohol dibasic acid esters, any of which may be used alone or in combinations of two or more.

From the viewpoint of adhesiveness between the formed coating film and base material and releasability between the formed coating film and mold, the internal mold release agent (D) preferably comprises a fatty acid ester, more preferably it comprises a fatty acid ester composed of an alcohol and a higher fatty acid of 12 or more carbon atoms, and most preferably it comprises a fatty acid ester composed of an alcohol and a fatty acid of 12 to 18 carbon atoms.

A commercial product may be used as an internal mold release agent comprising a fatty acid ester composed of an alcohol and a fatty acid of 12 to 18 carbon atoms. Examples of commercial products of internal mold release agents comprising fatty acid esters composed of alcohols and fatty acids of 12 to 18 carbon atoms include "BYK-P9065" (trade name of Byk-Chemie Corp.), "RIKEMAL TG-12" (trade name of Riken Vitamin Co., Ltd.) and "INT-120IMC" (trade name of Axel Co.).

When the coating composition of the invention comprises the internal mold release agent (D), the content of the internal mold release agent (D) is preferably in the range of 0.1 to 10 mass %, more preferably in the range of 0.2 to 5 mass % and even more preferably in the range of 0.3 to 3 mass % based on the total amount of the coating composition, from the viewpoint of adhesiveness between the formed coating film and base material, releasability between the formed coating film and mold and weather resistance and hardness of the formed coating film.

[Other Components]

Additives

The coating composition of the invention may further comprise an ultraviolet absorber and/or light stabilizer in addition to the components mentioned above. If necessary, other additives commonly used in the field of coating may be added as appropriate, including crosslinking agents, solvents (organic solvents, water), pigments, catalysts, antioxidants, surface control agents, antifoaming agents, emulsifiers, surfactants, antifouling agents, wetting agents, thickening agents, dyes, scratch resistance improvers and gloss adjusters.

Ultraviolet Absorber

Conventionally known ultraviolet absorbers may also be used, and examples include benzotriazole-based absorbers, triazine-based absorbers, salicylic acid derivative-based absorbers and benzophenone-based absorbers. The ultraviolet absorber may also contain a polymerizable unsaturated group.

Specific examples of benzotriazole-based absorbers include 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-(2'-hydroxy-4'-octoxyphenyl)benzotriazole, 2-{2'-hydroxy-3'-(3",4",5",6"-tetrahydrophthalimidemethyl)-5'-methylphenyl}benzotriazole and 2-[2-hydroxy-5-[2-(methacryloyloxy)ethyl]phenyl]-2H-benzotriazole.

Specific examples of triazine-based absorbers include 2,4-bis(2,4-dimethylphenyl)-6-(2-hydroxy-4-isooctyloxyphenyl)-1,3,5-triazine, 2-[4((2-hydroxy-3-dodecyloxypropyl)-oxy)-2-hydroxyphenyl]-4,6-bis(2,4-dimethylphenyl)-1,3,5-triazine, 2-[4-((2-hydroxy-3-tridecyloxypropyl)-oxy)-2-hydroxyphenyl]-4,6-bis(2,4-dimethylphenyl)-1,3,5-triazine and 2-(2,4-dihydroxyphenyl)-4,6-bis(2,4-dimethylphenyl)-1,3,5-triazine.

Specific examples of salicylic acid derivative-based absorbers include phenyl salicylate, p-octylphenyl salicylate and 4-tert-butylphenyl salicylate.

Specific examples of benzophenone-based absorbers include 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoylresorcinol, 4,6-dibenzoylresorcinol, hydroxydodecylbenzophenone and 2,2'-dihydroxy-4(3-methacryloxy-2-hydroxypropoxy)benzophenone.

Examples of commercial ultraviolet absorber products include "TINUVIN 900", "TINUVIN 928", "TINUVIN 384-2", "TINUVIN 479", "TINUVIN 405" and "TINUVIN 400" (TINUVIN is a registered trademark of BASF Corp.), and "RUVA 93" (trade name of Otsuka Chemical Co., Ltd.).

When the coating composition of the invention comprises the ultraviolet absorber, the content of the ultraviolet absorber is preferably in the range of 0.5 to 10 mass %, more preferably 0.8 to 9 mass % and even more preferably 1.0 to 8 mass % with respect to the total amount of the coating composition.

Light Stabilizer

The light stabilizer is used as a radical chain inhibitor to capture active radical species generated during degradation of the coating film, and hindered amine compound light stabilizers may be mentioned as examples.

Hindered piperidine compounds may be mentioned as light stabilizers that exhibiting excellent light-stabilizing action. Compounds of hindered piperidine compounds include monomer types such as bis(1,2,2,6,6-pentamethyl-4-piperidyl)sebacate, bis(2,2,6,6-tetramethyl-4-piperidinyl) sebacate, bis(N-methyl-2,2,6,6-tetramethyl-4-piperidinyl) sebacate, 4-benzoyloxy-2,2', 6,6'-tetramethylpiperidine and bis(1,2,2,6,6-pentamethyl-4-piperidyl){[3,5-bis(1,1-dimethylethyl)-4-hydroxyphenyl]methyl}butyl malonate; oligomer-types such as poly{[6-(1,1,3,3-tetramethylbutyl) imino-1,3,5-triazine-2,4-diyl][(2,2,6,6-tetramethyl-4-piperidyl)imino]hexamethylene[(2,2,6,6-tetramethyl-4-piperidyl)iminol]}; and polyester bond types such as polyesterified 4-hydroxy-2,2,6,6-tetramethyl-1-piperidineethanol and succinic acid, with no limitation to these. Publicly known polymerizable light stabilizers may also be used as light stabilizers.

Examples of commercially available light stabilizers include "TINUVIN 123", "TINUVIN 152" and "TINUVIN 292" (TINUVIN is a registered trademark of BASF Corp.), "HOSTAVIN 3058" (Hostavin is a registered trademark of Clariant Japan) and "ADK STAB LA-82" (ADK STAB is a registered trademark of Adeka Corp.).

When the coating composition of the invention comprises the light stabilizer, the content of the light stabilizer is preferably in the range of 0.5 to 10 mass %, more preferably 0.8 to 9 mass % and even more preferably 1.0 to 8 mass % with respect to the total amount of the coating composition.

Solvent

Examples of solvents to be used include organic solvents and water. Examples of organic solvents include ketone-based solvents such as acetone, methyl ethyl ketone and methyl isobutyl ketone; ester-based solvents such as ethyl acetate, butyl acetate, methyl benzoate, ethyl ethoxypropionate, ethyl propionate and methyl propionate; ether-based solvents such as tetrahydrofuran, dioxane and dimethoxyethane; glycol ether-based solvents such as ethyleneglycol monomethyl ether, ethyleneglycol monoethyl ether, diethyleneglycol monomethyl ether, propyleneglycol monomethyl ether acetate and 3-methoxybutyl acetate; aromatic solvents such as toluene, xylene, "SWASOL 1000" (high-boiling-point petroleum-based solvent, trade name of Cosmo Oil Co., Ltd.); and aliphatic hydrocarbon-based solvents such as hexane and heptane.

When the coating composition of the invention comprises the solvent, the content of the solvent is preferably in the range of 0 to 10 mass %, more preferably in the range of 0 to 7 mass % and even more preferably in the range of 0 to 3 mass % based on the total amount of the coating composition, from the viewpoint of increasing the solid content and improving the popping resistance of the obtained coating composition.

Pigment

The pigment used may be a brightness pigment, color pigment or extender pigment, for example. Such pigments may be used alone or in combinations of two or more.

Examples of brightness pigments include aluminum (including vapor deposited aluminum), copper, zinc, brass, nickel, glass flakes, aluminum oxide, mica, titanium oxide- and/or iron oxide-coated aluminum oxide, and titanium oxide- and/or iron oxide-coated mica.

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments, and heat-shielding pigments.

Examples of extender pigments include clay, kaolin, barium sulfate, barium carbonate, calcium carbonate, talc, silica and alumina white.

When the coating composition of the invention comprises the pigment, the content of the pigment is preferably in the range of 0.1 to 40 mass %, more preferably in the range of 3 to 30 mass % and even more preferably in the range of 5 to 20 mass % based on the total amount of the coating composition, from the viewpoint of adhesiveness between the formed coating film and base material, and weather resistance and hardness of the formed coating film.

Catalyst

Conventionally known catalysts may be used.

Specific examples of catalysts include organometallic compounds such as tin octylate, dibutyltin diacetate, dibutyltin di(2-ethyl hexanoate), dibutyltin dilaurate, dioctyltin diacetate, dioctyltin di(2-ethyl hexanoate), dioctyltin dineodecanoate, dibutyltin oxide, dibutyltin sulfide, dioctyltin oxide, dibutyltin fatty acid salts, lead 2-ethylhexanoate, zinc octylate, zinc naphthenate, fatty acid zinc compounds, bismuth octanoate, bismuth 2-ethylhexanoate, bismuth oleate, bismuth neodecanoate, bismuth versatate, bismuth naphthenate, cobalt naphthenate, calcium octylate, copper naphthenate and tetra(2-ethylhexyl)titanate; and tertiary amines, any of which may be used alone or in combinations of two or more.

When the coating composition of the invention comprises the catalyst, the content of the catalyst is preferably in the range of 0.005 to 2 mass %, and most preferably in the range of 0.01 to 1 mass % based on the total amount of the coating composition, from the viewpoint of adhesiveness between the formed coating film and base material, releasability between the formed coating film and mold and hardness of the formed coating film.

When the coating composition of the invention contains the catalyst, the coating composition of the invention may contain an organic acid such as acetic acid, propionic acid, butyric acid, isopentanoic acid, hexanoic acid, 2-ethylbutyric acid, naphthenic acid, octylic acid, nonanoic acid, decanoic acid, 2-ethylhexanoic acid, isooctanoic acid, isononanoic acid, laurylic acid, palmitic acid, stearic acid, oleic acid, linoleic acid, neodecanoic acid, versatic acid, isobutyric anhydride, itaconic anhydride, acetic anhydride, citraconic anhydride, propionic anhydride, maleic anhydride, butyric anhydride, citric anhydride, trimellitic anhydride, pyromellitic anhydride or phthalic anhydride; an inorganic acid such as hydrochloric acid or phosphoric acid; or a metal coordinating compound such as acetylacetone or an imidazole-based compound, from the viewpoint of storage stability and curability.

Method of Forming Coating Film from Coating Composition

After a wet coating film (uncured coating film) has been formed by applying the coating composition of the invention onto a base material, the wet coating film can be cured to form the desired coating film. The material of the base material is preferably a resin material from the viewpoint of adhesiveness between the formed coating film and base material.

The coating composition of the invention can be suitably used as a coating composition to be applied onto a resin-containing base material.

Examples of resin materials include acrylic resins such as polymethyl methacrylate, polyester resins such as polyethylene terephthalate, polyethylene naphthalate, poly-1,4-cyclohexanedimethylene terephthalate, polyethylene-1,2-diphenoxyethane-4,4'-dicarboxylate and polybutylene terephthalate, epoxy resins, such as the commercial product EPIKOTE (trade name of Yuka-Shell Epoxy Co., Ltd.), and polycarbonate resins, polyimide resins, novolac resins, phenol resins, acrylonitrile-butadiene-styrene (ABS) resins, acrylonitrile-ethylene-styrene (AES) resins, acrylonitrile-styrene-acrylate (ASA) resins, vinyl chloride resins, vinylidene chloride resins, polyurethane resins, cellulose ester resins (such as triacetyl cellulose, diacetyl cellulose, propionyl cellulose, butyryl cellulose, acetylpropionyl cellulose and nitrocellulose), polyamide resins, polystyrene resins (such as syndiotactic polystyrene), polyolefin resins (such as polypropylene, polyethylene and polymethylpentene), polysulfone resins, polyethersulfone resins, polyarylate resins, polyetherimide resins, polyether ketone resins, and various types of fiber-reinforced plastic materials (hereunder also abbreviated as FRP materials or simply FRPs).

The base material may be, for example, a resin material onto which a primer coating material, intermediate coating material or top coating material is applied, and a primer layer, intermediate coating layer or top coating layer is formed in advance.

The base material may also be previously treated by at least one type of physical method (physical treatment) selected from among plasma treatment, corona discharge treatment, active energy beam treatment, flame treatment, blasting and polishing.

The uses for articles onto which the coating composition of the invention is to be applied are not particularly restricted, and examples include outer plates of automobile bodies for passenger vehicles, trucks, motorcycles and buses; interior and exterior parts for automobiles, including bumpers, center pillars, mirrors, door handles, instrument panels, door trimmings and center consoles; furniture and building-related parts such as chairs, makeup mirrors, window frames and gates; and outer plates of household electrical appliances, such as cell phones and audio devices.

The method for applying the coating composition of the invention onto a base material is not particularly restricted. For example, the application may be carried out using an air sprayer, airless sprayer, rotary atomizing coater, dip coater, applicator, brush, roller or in-mold coating. Electrostatic application may also be used during the coating.

The coated film thickness may usually be in the range of 5 to 2000 μm, preferably 10 to 1500 μm and more preferably 15 to 1000 μm, as the cured film thickness.

The coating composition is preferably applied directly onto the base material.

The coating composition of the invention can be cured on the coated base material by heating the coating composition.

Heating

Heating may be accomplished by appropriate use of a method that is known in the field. Specifically, it can be accomplished using hot air, heated gas, an infrared heater, an IR radiator, an oven, a heated roller or microwaves. According to the invention, heating by hot air or an infrared heater is preferred from the viewpoint of facilitating operation.

The heating temperature is preferably in the range of 30 to 200° C., more preferably 60 to 180° C. and even more preferably 80 to 160° C. from the viewpoint of productivity, workability and base material thermostability. The heating time is preferably in the range of 20 seconds to 60 minutes, and more preferably 1 to 10 minutes.

The coating composition of the invention can be provided as a relatively low viscosity coating composition even with a high solid content, and is therefore suitable for application in an in-mold coating method. The in-mold coating method will generally be able to use a coating composition with low VOC content, while also reducing air-conditioning energy during application, and it is therefore advantageous for reducing environmental load.

When the coating composition of the invention is used in an in-mold coating method, the solid content of the coating composition of the invention is preferably in the range of 95 to 100 mass %, more preferably in the range of 97 to 100 mass % and most preferably 99 to 100 mass %.

The "solid content", as used herein, means the non-volatile components such as resin, curing agent and pigment, remaining in the composition after drying at 110° C. for 1 hour. Thus, the total solid content of the composition can be calculated by measuring the composition in a heat-proof container such as an aluminum foil cup, spreading the composition on the bottom of the container and then drying at 110° C. for 1 hour, and measuring the mass of the composition components remaining after drying to determine the ratio of the mass of the composition components remaining after drying with respect to the total mass of the composition before drying.

In-Mold Coating Method

The in-mold coating method of the invention includes a step of heating and molding a resin material in a mold, subsequently injecting the coating composition of the invention between the obtained molded article and the mold inner wall (the coating composition of the invention will be referred to as "in-mold coating composition" when used in an in-mold coating method) and curing the in-mold coating composition, and then removing the coated molded article from the mold.

The in-mold coating method used may be any conventional method for molding and coating in molds, without any particular restrictions. Specific methods include those described in JP 2000-141407 A and JP 2008-525212 A.

More specifically, the resin material that has been hot melted in an injection cylinder may be injected into a mold having the shape of the desired molded article, and cooled and pressed in the mold to shape the resin material, after which the mold may be opened, the in-mold coating composition may be injected in the gap formed between the resin material molded article and the mold walls, and the mold may be reclosed, heated and pressed for molding into the desired shape to obtain a molded article covered with the in-mold coating composition.

The mold used during molding of the resin material and the mold used during in-mold coating may be the same or different. When the mold used during molding of the resin material and the mold used during in-mold coating are different, the mold may be switched between the step of molding the resin material and the step of in-mold coating.

From the viewpoint of releasability between the in-mold coating molded article and the mold, the mold may also be coated with an external mold release agent. Examples of external mold release agents include external release agents that are fluorine-based, silicone-based, surfactant-based or wax-based.

For convenience, one mold may be referred to as the "male mold" and the other mold may be referred to as the "female mold".

The heating temperature during melting of the resin in the injection cylinder may be set as desired depending on the type of resin material, but it is preferably 80 to 300° C. The temperature of the mold during injection of the resin material may also be set as desired depending on the molding time and the type of resin material, but it is preferably 30 to 120° C.

The molding time for the resin material may be until the resin material completely solidifies, but the time is sufficient if the resin material firmly solidifies to an extent that the molded shape is not impaired when the in-mold coating composition is injected, and it is preferably about 20 seconds to 60 minutes. After then releasing the male mold from the surface of the molded article to provide a gap that is larger than the desired cured coating thickness but insufficient for release of the fitted molds, the in-mold coating composition is pressed (injected) into the area between the male mold and the molded article surface in an amount to produce a cured coating film of the desired thickness, and preferably 15 to 2000 μm. The surface of the molded article is uniformly covered by the in-mold coating composition while maintaining a temperature of about 80 to 120° C. in the mold, and a pressure of about 2 to 14 MPa is applied so that it permeates, maintaining this state for about 20 seconds to about 5 minutes until a cured coating film forms. After the cured coating film has been formed on the molded article surface in this manner, the mold is opened and the resulting in-mold coated molded article is removed from the mold.

The molding time from setting of the resin material until removal of the in-mold coated molded article from the mold is preferably in the range of 30 seconds to 5 minutes from the viewpoint of productivity.

EXAMPLES

The present invention will now be explained in greater detail using Examples and Comparative Examples. The Examples and Comparative Examples are merely for illustration and are not intended to limit the scope of the invention. Throughout the Examples and Comparative Examples, the "parts" and "%" values are based on mass, unless otherwise specified. The film thicknesses of the coating films are based on the cured coating films.

The components used in the Examples were as follows.

[Hydroxy Group-Containing Resin (A1)]
"DESMOPHEN XP 2488" (hydroxy group-containing polyester resin, trade name of Covestro AG),
"DESMOPHEN VPLS 2249/1" (hydroxy group-containing polyester resin, trade name of Covestro AG),
"URIC F-97" (castor oil-modified polyol, trade name of Itoh Oil Chemicals Co., Ltd.).

[Amino Group-Containing Resin (A2)]
"DESMOPHEN NH1420" (aspartic ester amine, trade name of Covestro AG),
"DESMOPHEN NH1220" (aspartic ester amine, trade name of Covestro AG).

[Polyisocyanate Compound (B)]
"SUMIDUR N3300" (isocyanurate ring adduct of hexamethylene diisocyanate, trade name of Sumika Covestro Urethane Co., Ltd.),
"DESMODUR N3400" (urethodione ring adduct of hexamethylene diisocyanate, trade name of Sumika Covestro Urethane Co., Ltd.),
"DESMODUR N3900" (polyisocyanate of hexamethylene diisocyanate, trade name of Sumika Covestro Urethane Co., Ltd.).

[Hydroxy Group-Containing Aromatic Compound (C)]
Benzyl alcohol (molecular weight: 108.1, number of hydroxy groups: 1, number of aromatic ring structures: 1),
2-phenylethanol (molecular weight: 122.2, number of hydroxy groups: 1, number of aromatic ring structures: 1),
2-phenoxyethanol (molecular weight: 138.2, number of hydroxy groups: 1, number of aromatic ring structures: 1),
naphthalene-1-ol (molecular weight: 144.2, number of hydroxy groups: 1, number of aromatic ring structures: 2),
(1,3-benzooxole-5-yl)methanol (molecular weight: 152.2, number of hydroxy groups: 1, number of aromatic ring structures: 1),
4-nonylphenol (molecular weight: 220.4, number of hydroxy groups: 1, number of aromatic ring structures: 1), "TERGITOL NP-9 Surfactant" (nonylphenolpolyethylene glycol ether, trade name of Dow Chemical Corp., molecular weight: 616, number of hydroxy groups: 1, number of aromatic ring structures: 1), "ADEKA Polyether BPX-11" (propylene oxide adduct of bisphenol A, trade name of Adeka Corp., molecular weight: ~360, number of hydroxy groups: 2, number of aromatic ring structures: 2), "ADEKA Polyether BPX-33" (propylene oxide adduct of bisphenol A, trade name of Adeka Corp., molecular weight: ~580, number of hydroxy groups: 2, number of aromatic ring structures: 2), "ADEKA Polyether BPX-55" (propylene oxide adduct of bisphenol A, trade name of Adeka Corp., molecular weight: ~790, number of hydroxy groups: 2, number of aromatic ring structures: 2), "ANTAGE SP" (mixture of monostyrenated phenol, distyrenated phenol and tristyrenated phenol, trade name of Kawaguchi Chemical Industry Co., Ltd., molecular weight: mixture of 198, 302, 406, number of hydroxy groups: 1, number of aromatic ring structures: mixture of 2, 3, 4).

[Internal Mold Release Agent (D)]

"BYK-P9065" (fatty acid ester-containing mixture, trade name of Byk-Chemie Corp.), "RIKEMAL TG-12" (fatty acid ester-containing mixture, trade name of Riken Vitamin Co., Ltd.), "INT-120IMC" (fatty acid ester-containing mixture, trade name of Axel Co.), "ZINC STEARATE GF-200" (zinc stearate, trade name of NOF Corp.).

[Comparison Components for (C)]

Ortho-xylene (molecular weight: 106.2, number of hydroxy groups: 0, number of aromatic ring structures: 1), naphthalene (molecular weight: 128.2, number of hydroxy groups: 0, number of aromatic ring structures: 2), 2-(2-butoxyethoxy)ethanol (molecular weight: 162.2, number of hydroxy groups: 1, number of aromatic ring structures: 0), cyclohexanol (molecular weight: 100.2, number of hydroxy groups: 1, number of aromatic ring structures: 0), 2,6-dimethyl-4-heptanone (molecular weight: 142.2, number of hydroxy groups: 0, number of aromatic ring structures: 0), "ADEKA Polyether BPX-2000" (propylene oxide adduct of bisphenol A, trade name of Adeka Corp., molecular weight: ~2000, number of hydroxy groups: 2, number of aromatic ring structures: 2).

[Other Additives]

"BYK-333" (surface control agent, trade name of Byk-Chemie Corp.),

"TINUVIN 400" (ultraviolet absorber, trade name of BASF Corp.),

"TINUVIN 292" (light stabilizer, trade name of BASF Corp.),

"NEOSTANN U-100" (tin catalyst, trade name of Nitto-Kasei Co.).

Production of Coating Composition

Example 1

In a reactor equipped with a thermometer, thermostat and stirrer there were added and uniformly mixed 32 parts of "DESMOPHEN XP2488" (hydroxy group-containing polyester resin, trade name of Covestro AG), 62 parts of "SUMIDUR N3300" (isocyanurate ring adduct of hexamethylene diisocyanate, trade name of Sumika Covestro Urethane Co., Ltd.), 3 parts of benzyl alcohol (molecular weight: 108.1, number of hydroxy groups: 1, number of aromatic ring structures: 1), 0.4 part of "BYK-333" (surface control agent, trade name of Byk-Chemie Corp.), 1 part of "TINUVIN 400" (ultraviolet absorber, trade name of BASF Corp.), 1 part of "TINUVIN 292" (light stabilizer, trade name of BASF Corp.) and 0.6 part of "NEOSTANN U-100" tin catalyst, trade name of Nitto-Kasei Co.), to obtain coating composition No. 1 having a viscosity of 4000 mPa·s as measured with a Brookfield viscometer at 25° C., 60 rpm, and a solid content of 99%.

Examples 2 to 23 and Comparative Examples 1 to 8

Coating compositions No. 2 to No. 31 were obtained in the same manner as Example 1, except that the composition in Example 1 was as shown in Table 1-1 to Table 1-5.

TABLE 1-1

|  |  |  | Example |  |  |  |  |  |
|---|---|---|---|---|---|---|---|---|
|  |  |  | 1 | 2 | 3 | 4 | 5 | 6 |
|  | Coating composition No. |  | 1 | 2 | 3 | 4 | 5 | 6 |
| Isocyanate reactive group-containing resin (A) | Hydroxy group-containing resin (A1) | DESMOPHEN XP 2488 | 32 | 32 | 32 | 32 | 32 | 32 |
|  |  | DESMOPHEN VPLS 2249/1 |  |  |  |  |  |  |
|  |  | URIC F-97 |  |  |  |  |  |  |
|  | Amino group-containing resin (A2) | DESMOPHEN NH1420 |  |  |  |  |  |  |
|  |  | DESMOPHEN NH1220 |  |  |  |  |  |  |
| Polyisocyanate compound (B) |  | SUMIDUR N3300 | 62 | 62 | 62 | 62 | 62 | 62 |
|  |  | DESMODUR N3400 |  |  |  |  |  |  |
|  |  | DESMODUR N3900 |  |  |  |  |  |  |
| Hydroxy group-containing aromatic compound (C) |  | Benzyl alcohol | 3 |  |  |  |  |  |
|  |  | 2-Phenylethanol |  | 3 |  |  |  |  |
|  |  | 2-Phenoxyethanol |  |  | 3 |  |  |  |
|  |  | Naphthalene-1-ol |  |  |  | 3 |  |  |
|  |  | (1,3-Benzooxole-5-yl)methanol |  |  |  |  | 3 |  |
|  |  | 4-Nonylphenol |  |  |  |  |  | 3 |
|  |  | TERGITOL NP-9 Surfactant |  |  |  |  |  |  |
|  |  | ADEKA Polyether BPX-11 |  |  |  |  |  |  |
|  |  | ADEKA Polyether BPX-33 |  |  |  |  |  |  |
|  |  | ADEKA Polyether BPX-55 |  |  |  |  |  |  |
|  |  | ANTAGE SP |  |  |  |  |  |  |

TABLE 1-1-continued

| | | Example | | | | | |
|---|---|---|---|---|---|---|---|
| | | 1 | 2 | 3 | 4 | 5 | 6 |
| Comparison component for (C) | Ortho-xylene | | | | | | |
| | Naphthalene | | | | | | |
| | 2-(2-Butoxyethoxy)ethanol | | | | | | |
| | Cyclohexanol | | | | | | |
| | 2,6-Dimethyl-4-heptanone | | | | | | |
| | ADEKA Polyether BPX-2000 | | | | | | |
| Surface control agent | BYK-333 | 0.4 | 0.4 | 0.4 | 0.4 | 0.4 | 0.4 |
| Ultraviolet absorber | TINUVIN 400 | 1 | 1 | 1 | 1 | 1 | 1 |
| Light stabilizer | TINUVIN 292 | 1 | 1 | 1 | 1 | 1 | 1 |
| Catalyst | NEOSTANN U-100 | 0.6 | 0.6 | 0.6 | 0.6 | 0.6 | 0.6 |
| | Total | 100 | 100 | 100 | 100 | 100 | 100 |
| | Solid content (%) | 99 | 99 | 99 | 99 | 99 | 99 |
| | Viscosity (25° C./mPa · s) | 4000 | 4000 | 4200 | 5500 | 5700 | 5500 |
| Features of (C) and comparison component for (C) | Molecular weight | 108 | 122 | 138 | 144 | 152 | 220 |
| | Number of hydroxy groups | 1 | 1 | 1 | 1 | 1 | 1 |
| | Number of aromatic ring structures | 1 | 1 | 1 | 2 | 1 | 1 |

TABLE 1-2

| | | Example | | | | |
|---|---|---|---|---|---|---|
| | | 7 | 8 | 9 | 10 | 11 |
| | Coating composition No. | 7 | 8 | 9 | 10 | 11 |
| Isocyanate reactive group-containing resin (A) | Hydroxy group-containing resin (A1) DESMOPHEN XP 2488 | 32 | 32 | 32 | 32 | 32 |
| | DESMOPHEN VPLS 2249/1 | | | | | |
| | URIC F-97 | | | | | |
| | Amino group-containing resin (A2) DESMOPHEN NH1420 | | | | | |
| | DESMOPHEN NH1220 | | | | | |
| Polyisocyanate compound (B) | SUMIDUR N3300 | 62 | 62 | 62 | 62 | 62 |
| | DESMODUR N3400 | | | | | |
| | DESMODUR N3900 | | | | | |
| Hydroxy group-containing aromatic compound (C) | Benzyl alcohol | | | | | |
| | 2-Phenylethanol | | | | | |
| | 2-Phenoxyethanol | | | | | |
| | Naphthalene-1-ol | | | | | |
| | (1,3-Benzooxole-5-yl)methanol | | | | | |
| | 4-Nonylphenol | | | | | |
| | TERGITOL NP-9 Surfactant | 3 | | | | |
| | ADEKA Polyether BPX-11 | | 3 | | | |
| | ADEKA Polyether BPX-33 | | | 3 | | |
| | ADEKA Polyether BPX-55 | | | | 3 | |
| | ANTAGE SP | | | | | 3 |
| Comparison component for (C) | Ortho-xylene | | | | | |
| | Naphthalene | | | | | |
| | 2-(2-Butoxyethoxy)ethanol | | | | | |
| | Cyclohexanol | | | | | |
| | 2,6-Dimethyl-4-heptanone | | | | | |
| | ADEKA Polyether BPX-2000 | | | | | |
| Surface control agent | BYK-333 | 0.4 | 0.4 | 0.4 | 0.4 | 0.4 |
| Ultraviolet absorber | TINUVIN 400 | 1 | 1 | 1 | 1 | 1 |
| Light stabilizer | TINUVIN 292 | 1 | 1 | 1 | 1 | 1 |
| Catalyst | NEOSTANN U-100 | 0.6 | 0.6 | 0.6 | 0.6 | 0.6 |
| | Total | 100 | 100 | 100 | 100 | 100 |
| | Solid content (%) | 100 | 99 | 100 | 100 | 99 |
| | Viscosity (25° C./mPa · s) | 5400 | 6000 | 6100 | 6200 | 5000 |
| Features of (C) and comparison component for (C) | Molecular weight | 616 | ~360 | ~580 | ~790 | 198, 302, 406 |
| | Number of hydroxy groups | 1 | 2 | 2 | 2 | 1 |
| | Number of aromatic ring structures | 1 | 2 | 2 | 2 | 2, 3, 4 |

TABLE 1-3

|  |  |  | Example | | | | |
|---|---|---|---|---|---|---|---|
|  |  |  | 12 | 13 | 14 | 15 | 16 |
|  |  | Coating composition No. | 12 | 13 | 14 | 15 | 16 |
| Isocyanate reactive group-containing resin (A) | Hydroxy group-containing resin (A1) | DESMOPHEN XP 2488 |  |  |  | 32 | 33 |
|  |  | DESMOPHEN VPLS 2249/1 | 32 |  |  |  |  |
|  |  | URIC F-97 |  |  | 32 |  |  |
|  | Amino group-containing resin (A2) | DESMOPHEN NH1420 |  |  |  |  | 32 |
|  |  | DESMOPHEN NH1220 |  |  |  |  |  |
| Polyisocyanate compound (B) |  | SUMIDUR N3300 | 62 | 62 |  |  | 62 |
|  |  | DESMODUR N3400 |  |  | 62 |  |  |
|  |  | DESMODUR N3900 |  |  |  | 61 |  |
| Hydroxy group-containing aromatic compound (C) |  | Benzyl alcohol |  |  |  |  |  |
|  |  | 2-Phenylethanol |  |  |  |  |  |
|  |  | 2-Phenoxyethanol |  |  |  |  |  |
|  |  | Naphthalene-1-ol |  |  |  |  |  |
|  |  | (1,3-Benzooxole-5-yl)methanol |  |  |  |  |  |
|  |  | 4-Nonylphenol |  |  |  |  |  |
|  |  | TERGITOL NP-9 Surfactant |  |  |  |  |  |
|  |  | ADEKA Polyether BPX-11 |  |  |  |  |  |
|  |  | ADEKA Polyether BPX-33 |  |  |  |  |  |
|  |  | ADEKA Polyether BPX-55 |  |  |  |  |  |
|  |  | ANTAGE SP | 3 | 3 | 3 | 3 | 3 |
| Comparison component for (C) |  | Ortho-xylene |  |  |  |  |  |
|  |  | Naphthalene |  |  |  |  |  |
|  |  | 2-(2-Butoxyethoxy)ethanol |  |  |  |  |  |
|  |  | Cyclohexanol |  |  |  |  |  |
|  |  | 2,6-Dimethyl-4-heptanone |  |  |  |  |  |
|  |  | ADEKA Polyether BPX-2000 |  |  |  |  |  |
| Surface control agent |  | BYK-333 | 0.4 | 0.4 | 0.4 | 0.4 | 0.4 |
| Ultraviolet absorber |  | TINUVIN 400 | 1 | 1 | 1 | 1 | 1 |
| Light stabilizer |  | TINUVIN 292 | 1 | 1 | 1 | 1 | 1 |
| Catalyst |  | NEOSTANN U-100 | 0.6 | 0.6 | 0.6 | 0.6 | 0.6 |
|  |  | Total | 100 | 100 | 100 | 100 | 100 |
|  |  | Solid content (%) | 99 | 99 | 99 | 99 | 99 |
|  |  | Viscosity (25° C./mPa · s) | 6000 | 6500 | 4500 | 6000 | 2400 |
| Features of (C) and comparison component for (C) |  | Molecular weight | 198, 302, 406 | 198, 302, 406 | 198, 302, 406 | 198, 302, 406 | 198, 302, 406 |
|  |  | Number of hydroxy groups | 1 | 1 | 1 | 1 | 1 |
|  |  | Number of aromatic ring structures | 2, 3, 4 | 2, 3, 4 | 2, 3, 4 | 2, 3, 4 | 2, 3, 4 |

TABLE 1-4

|  |  |  | Example | | | | | | |
|---|---|---|---|---|---|---|---|---|---|
|  |  |  | 17 | 18 | 19 | 20 | 21 | 22 | 23 |
|  |  | Coating composition No. | 17 | 18 | 19 | 20 | 21 | 22 | 23 |
| Isocyanate reactive group-containing resin (A) | Hydroxy group-containing resin (A1) | DESMOPHEN XP 2488 |  |  |  |  |  | 22 | 33 |
|  |  | DESMOPHEN VPLS 2249/1 |  |  |  |  |  |  |  |
|  |  | URIC F-97 |  |  |  |  |  |  |  |
|  | Amino group-containing resin (A2) | DESMOPHEN NH1420 | 32 | 32 | 32 | 32 |  |  |  |
|  |  | DESMOPHEN NH1220 |  |  |  |  | 32 | 10 |  |
| Polyisocyanate compound (B) |  | SUMIDUR N3300 | 62 | 62 | 62 | 62 | 62 | 62 | 64 |
|  |  | DESMODUR N3400 |  |  |  |  |  |  |  |
|  |  | DESMODUR N3900 |  |  |  |  |  |  |  |
| Hydroxy group-containing aromatic compound (C) |  | Benzyl alcohol | 3 |  |  |  |  |  |  |
|  |  | 2-Phenylethanol |  |  |  |  |  |  |  |
|  |  | 2-Phenoxyethanol |  |  |  |  |  |  |  |
|  |  | Naphthalene-1-ol |  |  | 3 |  |  |  |  |
|  |  | (1,3-Benzooxole-5-yl)methanol |  |  |  | 3 |  |  |  |
|  |  | 4-Nonylphenol |  |  |  |  |  |  |  |
|  |  | TERGITOL NP-9 Surfactant |  |  |  |  |  |  |  |
|  |  | ADEKA Polyether BPX-11 |  |  |  |  |  |  |  |
|  |  | ADEKA Polyether BPX-33 |  |  |  |  | 3 |  |  |
|  |  | ADEKA Polyether BPX-55 |  |  |  |  |  |  |  |
|  |  | ANTAGE SP |  |  |  |  |  | 3 | 3 |

TABLE 1-4-continued

|  |  | Example | | | | | | |
|---|---|---|---|---|---|---|---|---|
|  |  | 17 | 18 | 19 | 20 | 21 | 22 | 23 |
| Comparison component for (C) | Ortho-xylene | | | | | | | |
|  | Naphthalene | | | | | | | |
|  | 2-(2-Butoxyethoxy)ethanol | | | | | | | |
|  | Cyclohexanol | | | | | | | |
|  | 2,6-Dimethyl-4-heptanone | | | | | | | |
|  | ADEKA Polyether BPX-2000 | | | | | | | |
| Surface control agent | BYK-333 | 0.4 | 0.4 | 0.4 | 0.4 | 0.4 | 0.4 | |
| Ultraviolet absorber | TINUVIN 400 | 1 | 1 | 1 | 1 | 1 | 1 | |
| Light stabilizer | TINUVIN 292 | 1 | 1 | 1 | 1 | 1 | 1 | |
| Catalyst | NEOSTANN U-100 | 0.6 | 0.6 | 0.6 | 0.6 | 0.6 | 0.6 | |
|  | Total | 100 | 100 | 100 | 100 | 100 | 100 | 100 |
|  | Solid content (%) | 99 | 99 | 99 | 99 | 99 | 99 | 99 |
|  | Viscosity (25° C./mPa·s) | 2200 | 2500 | 2500 | 2700 | 500 | 2000 | 2000 |
| Features of (C) and comparison component for (C) | Molecular weight | 108 | 144 | 152 | ~580 | 198, 302, 406 | 198, 302, 406 | 198, 302, 406 |
|  | Number of hydroxy groups | 1 | 1 | 1 | 2 | 1 | 1 | 1 |
|  | Number of aromatic ring structures | 1 | 2 | 1 | 2 | 2, 3, 4 | 2, 3, 4 | 2, 3, 4 |

TABLE 1-5

|  |  |  | Comparative Example | | | | | | | |
|---|---|---|---|---|---|---|---|---|---|---|
|  |  |  | 1 | 2 | 3 | 4 | 5 | 6 | 7 | 8 |
|  | Coating composition No. |  | 24 | 25 | 26 | 27 | 28 | 29 | 30 | 31 |
| Isocyanate reactive group-containing resin (A) | Hydroxy group-containing resin (A1) | DESMOPHEN XP 2488 | 32 | 32 | 32 | 32 | 32 | 32 | 33 | |
|  |  | DESMOPHEN VPLS 2249/1 | | | | | | | | |
|  |  | URIC F-97 | | | | | | | | |
|  | Amino group-containing resin (A2) | DESMOPHEN NH1420 | | | | | | | | 33 |
|  |  | DESMOPHEN NH1220 | | | | | | | | |
| Polyisocyanate compound (B) | SUMIDUR N3300 | | 62 | 62 | 62 | 62 | 62 | 62 | 64 | 64 |
|  | DESMODUR N3400 | | | | | | | | | |
|  | DESMODUR N3900 | | | | | | | | | |
| Hydroxy group-containing aromatic compound (C) | Benzyl alcohol | | | | | | | | | |
|  | 2-Phenylethanol | | | | | | | | | |
|  | 2-Phenoxyethanol | | | | | | | | | |
|  | Naphthalene-1-ol | | | | | | | | | |
|  | (1,3-Benzooxole-5-yl)methanol | | | | | | | | | |
|  | 4-Nonylphenol | | | | | | | | | |
|  | TERGITOL NP-9 Surfactant | | | | | | | | | |
|  | ADEKA Polyether BPX-11 | | | | | | | | | |
|  | ADEKA Polyether BPX-33 | | | | | | | | | |
|  | ADEKA Polyether BPX-55 | | | | | | | | | |
|  | ANTAGE SP | | | | | | | | | |
| Comparison component for (C) | Ortho-xylene | | 3 | | | | | | | |
|  | Naphthalene | | | 3 | | | | | | |
|  | 2-(2-Butoxyethoxy)ethanol | | | | 3 | | | | | |
|  | Cyclohexanol | | | | | 3 | | | | |
|  | 2,6-Dimethyl-4-heptanone | | | | | | 3 | | | |
|  | ADEKA Polyether BPX-2000 | | | | | | | 3 | | |
| Surface control agent | BYK-333 | | 0.4 | 0.4 | 0.4 | 0.4 | 0.4 | 0.4 | 0.4 | 0.4 |
| Ultraviolet absorber | TINUVIN 400 | | 1 | 1 | 1 | 1 | 1 | 1 | 1 | 1 |
| Light stabilizer | TINUVIN 292 | | 1 | 1 | 1 | 1 | 1 | 1 | 1 | 1 |
| Catalyst | NEOSTANN U-100 | | 0.6 | 0.6 | 0.6 | 0.6 | 0.6 | 0.6 | 0.6 | 0.6 |
|  | Total | | 100 | 100 | 100 | 100 | 100 | 100 | 100 | 100 |
|  | Solid content (%) | | 97 | 97 | 97 | 97 | 97 | 100 | 100 | 100 |
|  | Viscosity (25° C./mPa·s) | | 3900 | 3900 | 3900 | 3900 | 3900 | 15,000 | 6500 | 2500 |
| Features of (C) and comparison component for (C) | Molecular weight | | 106 | 128 | 162 | 100 | 142 | ~2000 | — | — |
|  | Number of hydroxy groups | | 0 | 0 | 1 | 1 | 0 | 2 | — | — |
|  | Number of aromatic ring structures | | 1 | 2 | 0 | 0 | 0 | 2 | — | — |

Fabrication of Test Coated Sheets

Example 24

(Fabrication of Test Coated Sheet (T1))

An acrylonitrile-butadiene-styrene resin (ABS resin) base material surface with dimensions of 100 mm length×100 mm width×2 mm thickness was degreased with isopropyl alcohol, after which coating composition No. 1 obtained in Example 1 was applied into the base material surface using a bar coater to a cured film thickness of 100 µm, and set for 1 minute at ordinary temperature. It was then heated and cured at 100° C. for 3 minutes to fabricate test coated sheet (T1-1).

(Fabrication of Test Coated Sheet (T2))

A polycarbonate resin base material surface with dimensions of 100 mm length×100 mm width×3 mm thickness was degreased with isopropyl alcohol, after which coating composition No. 1 obtained in Production Example 1 was applied into the base material surface using a bar coater to a cured film thickness of 100 µm, and set for 1 minute at ordinary temperature. It was then heated and cured at 100° C. for 3 minutes to fabricate test coated sheet (T2-1).

Examples 25 to 46 and Comparative Examples 9 to 16

Test coated sheets (T1-2) to (T1-31) and (T2-2) to (T2-31) were fabricated in the same manner as Example 24, except that the type of coating composition in Example 24 was as shown in Table 2-1 to Table 2-5.

Evaluation Method

Each of the obtained test coated sheets was evaluated for adhesiveness, gloss, pencil hardness and popping resistance. The evaluation results are shown in Table 2-1 to Table 2-5.

(Adhesiveness)

Following the procedure specified by JIS K 5600-5-6 (1990), a grid pattern of 2 mm×2 mm 100-squares was formed on the coating surface of test coated sheet (T1) and test coated sheet (T2), adhesive tape was attached to the surface, and after abruptly peeling it off, the state of the remaining square grid coating film was examined and the initial adhesiveness was evaluated on the following scale. Scores of VG and G are acceptable.

VG: 100 squares remaining on the square grid coating film, no edge chipping,
G: 100 squares remaining on the square grid coating film, but with edge chipping,
P: 99 or fewer squares remaining on square grid coating film.

Each test coated sheet was immersed for 240 hours in hot water at 40° C. and then raised up and dried for 12 hours at 20° C., after which a grid pattern of 2 mm×2 mm 100-squares was formed on the coated surface according to JIS K 5600-5-6(1990), adhesive tape was attached to the surface and abruptly peeled off, and the state of the remaining square grid coating film was examined and the adhesiveness after water resistance testing was evaluated on the following scale. Scores of VG and G are acceptable.

VG: 100 squares remaining on the square grid coating film, no edge chipping,
G: 100 squares remaining on the square grid coating film, but with edge chipping,
P: 99 or fewer squares remaining on square grid coating film.

(Gloss)

The 60° gloss value of the obtained test coated sheet (T1) was measured using a gloss meter (micro-TRI-gloss, BYK-Gardner), and the gloss was evaluated on the following scale. Scores of VG and G are acceptable.

VG: 60° gloss of ≥90,
G:: 60° gloss of ≥85 and <90,
P: 60° gloss of <85.

(Pencil Hardness)

The pencil hardness of the coating surface of the test coated sheet (T1) was measured according to JIS K 5600-5-4(1999), "Scratch hardness (pencil method)". The pencil hardness is evaluated in the order: 3B<2B<B<HB<F<H, with a pencil hardness of HB or greater considered acceptable.

(Popping Resistance)

The test coated sheet (T1) was visually observed and the number of pops occurring on the test coated sheet was counted, evaluating the popping resistance on the following scale. Scores of VG and G are acceptable.

VG: No pops found on test coated sheet,
G: 1 to 3 pops found on test coated sheet,
P: 4 or more pops found on test coated sheet.

TABLE 2-1

| | | | Example | | | | | |
|---|---|---|---|---|---|---|---|---|
| | | | 24 | 25 | 26 | 27 | 28 | 29 |
| | Coating composition No. | | 1 | 2 | 3 | 4 | 5 | 6 |
| | Solid content (%) | | 99 | 99 | 99 | 99 | 99 | 99 |
| | Viscosity (25° C./mPa · s) | | 4000 | 4000 | 4200 | 5500 | 5700 | 5500 |
| Features of (C) and comparison component for (C) | Molecular weight | | 108 | 122 | 138 | 144 | 152 | 220 |
| | Number of hydroxy groups | | 1 | 1 | 1 | 1 | 1 | 1 |
| | Number of aromatic ring structures | | 1 | 1 | 1 | 2 | 1 | 1 |
| Evaluation | Test coated sheet (T1) | Test coated sheet name | (T1-1) | (T1-2) | (T1-3) | (T1-4) | (T1-5) | (T1-6) |
| | | Initial adhesiveness | VG | G | G | VG | VG | G |
| | | Adhesiveness after water resistance testing | G | G | G | VG | G | G |
| | | Gloss | G | G | G | VG | G | VG |
| | | Pencil hardness | HB | HB | HB | HB | F | HB |
| | | Popping resistance | G | G | G | VG | VG | G |

TABLE 2-1-continued

|  |  |  | Example | | | | | |
|---|---|---|---|---|---|---|---|---|
|  |  |  | 24 | 25 | 26 | 27 | 28 | 29 |
|  | Test coated sheet (T2) | Test coated sheet name | (T2-1) | (T2-2) | (T2-3) | (T2-4) | (T2-5) | (T2-6) |
|  |  | Initial adhesiveness | G | G | G | G | G | G |
|  |  | Adhesiveness after water resistance testing | G | G | G | G | G | G |

TABLE 2-2

|  |  |  | Example | | | | |
|---|---|---|---|---|---|---|---|
|  |  |  | 30 | 31 | 32 | 33 | 34 |
|  | Coating composition No. |  | 7 | 8 | 9 | 10 | 11 |
|  | Solid content (%) |  | 100 | 99 | 100 | 100 | 99 |
|  | Viscosity (25° C./mPa · s) |  | 5400 | 6000 | 6100 | 6200 | 5000 |
| Features of (C) and comparison component for (C) | Molecular weight |  | 616 | ~360 | ~580 | ~790 | 198, 302, 406 |
|  | Number of hydroxy groups |  | 1 | 2 | 2 | 2 | 1 |
|  | Number of aromatic ring structures |  | 1 | 2 | 2 | 2 | 2, 3, 4 |
| Evaluation | Test coated sheet (T1) | Test coated sheet name | (T1-7) | (T1-8) | (T1-9) | (T1-10) | (T1-11) |
|  |  | Initial adhesiveness | G | VG | VG | VG | VG |
|  |  | Adhesiveness after water resistance testing | VG | VG | VG | VG | VG |
|  |  | Gloss | G | VG | VG | VG | VG |
|  |  | Pencil hardness | HB | HB | HB | HB | F |
|  |  | Popping resistance | G | VG | VG | VG | VG |
|  | Test coated sheet (T2) | Test coated sheet name | (T2-7) | (T2-8) | (T2-9) | (T2-10) | (T2-11) |
|  |  | Initial adhesiveness | G | VG | VG | VG | G |
|  |  | Adhesiveness after water resistance testing | G | VG | VG | VG | G |

TABLE 2-3

|  |  |  | Example | | | | |
|---|---|---|---|---|---|---|---|
|  |  |  | 35 | 36 | 37 | 38 | 39 |
|  | Coating composition No. |  | 12 | 13 | 14 | 15 | 16 |
|  | Solid content (%) |  | 99 | 99 | 99 | 99 | 99 |
|  | Viscosity (25° C./mPa · s) |  | 6000 | 6500 | 4500 | 6000 | 2400 |
| Features of (C) and comparison component for (C) | Molecular weight |  | 198, 302, 406 | 198, 302, 406 | 198, 302, 406 | 198, 302, 406 | 198, 302, 406 |
|  | Number of hydroxy groups |  | 1 | 1 | 1 | 1 | 1 |
|  | Number of aromatic ring structures |  | 2, 3, 4 | 2, 3, 4 | 2, 3, 4 | 2, 3, 4 | 2, 3, 4 |
| Evaluation | Test coated sheet (T1) | Test coated sheet name | (T1-12) | (T1-13) | (T1-14) | (T1-15) | (T1-16) |
|  |  | Initial adhesiveness | VG | VG | VG | VG | VG |
|  |  | Adhesiveness after water resistance testing | VG | VG | VG | VG | VG |
|  |  | Gloss | VG | VG | VG | VG | VG |
|  |  | Pencil hardness | F | F | HB | HB | F |
|  |  | Popping resistance | VG | VG | VG | VG | VG |
|  | Test coated sheet (T2) | Test coated sheet name | (T2-12) | (T2-13) | (T2-14) | (T2-15) | (T2-16) |
|  |  | Initial adhesiveness | G | G | G | G | G |
|  |  | Adhesiveness after water resistance testing | G | G | G | G | G |

TABLE 2-4

| | | | Example | | | | | |
|---|---|---|---|---|---|---|---|---|
| | | | 40 | 41 | 42 | 43 | 44 | 45 | 46 |
| | Coating composition No. | | 17 | 18 | 19 | 20 | 21 | 22 | 23 |
| | Solid content (%) | | 99 | 99 | 99 | 99 | 99 | 99 | 99 |
| | Viscosity (25° C./mPa · s) | | 2200 | 2500 | 2500 | 2700 | 500 | 2000 | 2000 |
| Features of (C) and comparison component for (C) | Molecular weight | | 108 | 144 | 152 | ~580 | 198, 302, 406 | 198, 302, 406 | 198, 302, 406 |
| | Number of Hydroxy groups | | 1 | 1 | 1 | 2 | 1 | 1 | 1 |
| | Number of aromatic ring structures | | 1 | 2 | 1 | 2 | 2, 3, 4 | 2, 3, 4 | 2, 3, 4 |
| Evaluation | Test coated sheet (T1) | Test coated sheet name | (T1-17) | (T1-18) | (T1-19) | (T1-20) | (T1-21) | (T1-22) | (T1-23) |
| | | Initial adhesiveness | VG | VG | VG | VG | VG | VG | G |
| | | Adhesiveness after water resistance testing | VG | VG | VG | VG | VG | VG | G |
| | | Gloss | G | VG | G | VG | VG | VG | VG |
| | | Pencil hardness | F | HB | HB | F | F | HB | HB |
| | | Popping resistance | G | G | G | G | G | G | G |
| | Test coated sheet (T2) | Test coated sheet name | (T2-17) | (T2-18) | (T2-19) | (T2-20) | (T2-21) | (T2-22) | (T2-23) |
| | | Initial adhesiveness | G | G | G | VG | G | G | G |
| | | Adhesiveness after water resistance testing | G | G | G | VG | G | G | G |

TABLE 2-5

| | | | Comparative Example | | | | | | | |
|---|---|---|---|---|---|---|---|---|---|---|
| | | | 9 | 10 | 11 | 12 | 13 | 14 | 15 | 16 |
| | Coating composition No. | | 24 | 25 | 26 | 27 | 28 | 29 | 30 | 31 |
| | Solid content (%) | | 97 | 97 | 97 | 97 | 97 | 100 | 100 | 100 |
| | Viscosity (25° C./mPa · s) | | 3900 | 3900 | 3900 | 3900 | 3900 | 15,000 | 6500 | 2500 |
| Features of (C) and comparison component for (C) | Molecular weight | | 106 | 128 | 162 | 100 | 142 | ~2000 | — | — |
| | Number of hydroxy groups | | 0 | 0 | 1 | 1 | 0 | 2 | — | — |
| | Number of aromatic ring structures | | 1 | 2 | 0 | 0 | 0 | 2 | — | — |
| Evaluation | Test coated sheet (T1) | Test coated sheet name | (T1-24) | (T1-25) | (T1-26) | (T1-27) | (T1-28) | (T1-29) | (T1-30) | (T1-31) |
| | | Initial adhesiveness | P | P | P | P | P | P | P | P |
| | | Adhesiveness after water resistance testing | P | P | P | P | P | P | P | P |
| | | Gloss | P | G | G | P | P | G | G | G |
| | | Pencil hardness | B | B | B | B | B | B | HB | HB |
| | | Popping resistance | P | P | P | P | P | G | G | G |
| | Test coated sheet (T2) | Test coated sheet name | (T2-24) | (T2-25) | (T2-26) | (T2-27) | (T2-28) | (T2-29) | (T2-30) | (T2-31) |
| | | Initial adhesiveness | P | P | P | P | P | P | P | P |
| | | Adhesiveness after water resistance testing | P | P | P | P | P | P | P | P |

Production of In-Mold Coating Composition

Example 47

In a reactor equipped with a thermometer, thermostat and stirrer there were added and uniformly mixed 32 parts of "DESMOPHEN XP2488" (hydroxy group-containing polyester resin, trade name of Covestro AG), 61 parts of "SUMI-DUR N3300" (isocyanurate ring adduct of hexamethylene diisocyanate, trade name of Sumika Covestro Urethane Co., Ltd.), 3 parts of benzyl alcohol (molecular weight: 108.1, number of hydroxy groups: 1, number of aromatic ring structures: 1), 0.4 part of "BYK-333" (surface control agent, trade name of Byk-Chemie Corp.), 1 part of "TINUVIN 400" (ultraviolet absorber, trade name of BASF Corp.), 1 part of "TINUVIN 292" (light stabilizer, trade name of BASF Corp.), 0.6 part of "NEOSTANN U-100" tin catalyst, trade name of Nitto-Kasei Co.) and 1 part of "RIKEMAL TG-12" (fatty acid ester-containing internal mold release agent, trade name of Riken Vitamin Co., Ltd.), to obtain coating composition No. 32 having a viscosity of 4000 mPa·s as measured with a Brookfield viscometer at 25° C., 60 rpm, and a solid content of 99%.

Examples 48 to 73 and Comparative Examples 17 to 24

Coating compositions No. 32 to No. 66 were obtained in the same manner as Example 47, except that the composition in Example 47 was as shown in Table 3-1 to Table 3-6.

TABLE 3-1

|  |  | Example | | | | | |
|---|---|---|---|---|---|---|---|
|  |  | 47 | 48 | 49 | 50 | 51 | 52 |
|  | Coating composition No. | 32 | 33 | 34 | 35 | 36 | 37 |
| Isocyanate reactive group-containing resin (A) | Hydroxy group-containing resin (A1) DESMOPHEN XP 2488 | 32 | 32 | 32 | 32 | 32 | 32 |
|  | DESMOPHEN VPLS 2249/1 | | | | | | |
|  | URIC F-97 | | | | | | |
|  | Amino group-containing resin (A2) DESMOPHEN NH1420 | | | | | | |
|  | DESMOPHEN NH1220 | | | | | | |
| Polyisocyanate compound (B) | SUMIDUR N3300 | 61 | 61 | 61 | 61 | 61 | 61 |
|  | DESMODUR N3400 | | | | | | |
|  | DESMODUR N3900 | | | | | | |
| Hydroxy group-containing aromatic compound (C) | Benzyl alcohol | 3 | | | | | |
|  | 2-Phenylethanol | | 3 | | | | |
|  | 2-Phenoxyethanol | | | 3 | | | |
|  | Naphthalene-1-ol | | | | 3 | | |
|  | (1,3-Benzooxole-5-yl)methanol | | | | | 3 | |
|  | 4-Nonylphenol | | | | | | 3 |
|  | TERGITOL NP-9 Surfactant | | | | | | |
|  | ADEKA Polyether BPX-11 | | | | | | |
|  | ADEKA Polyether BPX-33 | | | | | | |
|  | ADEKA Polyether BPX-55 | | | | | | |
|  | ANTAGE SP | | | | | | |
| Internal mold release agent (D) | RIKEMAL TG-12 | 1 | 1 | 1 | 1 | 1 | 1 |
|  | BYK-P9065 | | | | | | |
|  | INT-120IMC | | | | | | |
|  | Zinc stearate GF-200 | | | | | | |
| Comparison component for (C) | Ortho-xylene | | | | | | |
|  | Naphthalene | | | | | | |
|  | 2-(2-Butoxyethoxy)ethanol | | | | | | |
|  | Cyclohexanol | | | | | | |
|  | 2,6-Dimethyl-4-heptanone | | | | | | |
|  | ADEKA Polyether BPX-2000 | | | | | | |
| Surface control agent | BYK-333 | 0.4 | 0.4 | 0.4 | 0.4 | 0.4 | 0.4 |
| Ultraviolet absorber | TINUVIN 400 | 1 | 1 | 1 | 1 | 1 | 1 |
| Light stabilizer | TINUVIN 292 | 1 | 1 | 1 | 1 | 1 | 1 |
| Catalyst | NEOSTANN U-100 | 0.6 | 0.6 | 0.6 | 0.6 | 0.6 | 0.6 |
|  | Total | 100 | 100 | 100 | 100 | 100 | 100 |
|  | Solid content (%) | 99 | 99 | 99 | 99 | 99 | 99 |
|  | Viscosity (25° C./mPa·s) | 4000 | 4000 | 4200 | 5500 | 5700 | 5500 |
| Features of (C) and comparison component for (C) | Molecular weight | 108 | 122 | 138 | 144 | 152 | 220 |
|  | Number of hydroxy groups | 1 | 1 | 1 | 1 | 1 | 1 |
|  | Number of aromatic ring structures | 1 | 1 | 1 | 2 | 1 | 1 |

TABLE 3-2

|  |  | Example | | | | |
|---|---|---|---|---|---|---|
|  |  | 53 | 54 | 55 | 56 | 57 |
|  | Coating composition No. | 38 | 39 | 40 | 41 | 42 |
| Isocyanate reactive group-containing resin (A) | Hydroxy group-containing resin (A1) DESMOPHEN XP 2488 | 32 | 32 | 32 | 32 | 32 |
|  | DESMOPHEN VPLS 2249/1 | | | | | |
|  | URIC F-97 | | | | | |
|  | Amino group-containing resin (A2) DESMOPHEN NH1420 | | | | | |
|  | DESMOPHEN NH1220 | | | | | |
| Polyisocyanate compound (B) | SUMIDUR N3300 | 61 | 61 | 61 | 61 | 61 |
|  | DESMODUR N3400 | | | | | |
|  | DESMODUR N3900 | | | | | |
| Hydroxy group-containing aromatic compound (C) | Benzyl alcohol | | | | | |
|  | 2-Phenylethanol | | | | | |
|  | 2-Phenoxyethanol | | | | | |
|  | Naphthalene-1-ol | | | | | |
|  | (1,3-Benzooxole-5-yl)methanol | | | | | |
|  | 4-Nonylphenol | | | | | |
|  | TERGITOL NP-9 Surfactant | 3 | | | | |
|  | ADEKA Polyether BPX-11 | | 3 | | | |
|  | ADEKA Polyether BPX-33 | | | 3 | | |
|  | ADEKA Polyether BPX-55 | | | | 3 | |
|  | ANTAGE SP | | | | | 3 |

TABLE 3-2-continued

|  |  | Example | | | | |
|---|---|---|---|---|---|---|
|  |  | 53 | 54 | 55 | 56 | 57 |
| Internal mold release agent (D) | RIKEMAL TG-12 | 1 | 1 | 1 | 1 | 1 |
|  | BYK-P9065 |  |  |  |  |  |
|  | INT-120IMC |  |  |  |  |  |
|  | Zinc stearate GF-200 |  |  |  |  |  |
| Comparison component for (C) | Ortho-xylene |  |  |  |  |  |
|  | Naphthalene |  |  |  |  |  |
|  | 2-(2-Butoxyethoxy)ethanol |  |  |  |  |  |
|  | Cyclohexanol |  |  |  |  |  |
|  | 2,6-Dimethyl-4-heptanone |  |  |  |  |  |
|  | ADEKA Polyether BPX-2000 |  |  |  |  |  |
| Surface control agent | BYK-333 | 0.4 | 0.4 | 0.4 | 0.4 | 0.4 |
| Ultraviolet absorber | TINUVIN 400 | 1 | 1 | 1 | 1 | 1 |
| Light stabilizer | TINUVIN 292 | 1 | 1 | 1 | 1 | 1 |
| Catalyst | NEOSTANN U-100 | 0.6 | 0.6 | 0.6 | 0.6 | 0.6 |
|  | Total | 100 | 100 | 100 | 100 | 100 |
|  | Solid content (%) | 100 | 99 | 100 | 100 | 99 |
|  | Viscosity (25° C./mPa · s) | 5400 | 6000 | 6100 | 6200 | 5000 |
| Features of (C) and comparison component for (C) | Molecular weight | 616 | ~360 | ~580 | ~790 | 198, 302, 406 |
|  | Number of hydroxy groups | 1 | 2 | 2 | 2 | 1 |
|  | Number of aromatic ring structures | 1 | 2 | 2 | 2 | 2, 3, 4 |

TABLE 3-3

|  |  |  | Example | | | | |
|---|---|---|---|---|---|---|---|
|  |  |  | 58 | 59 | 60 | 61 | 62 |
|  | Coating composition No. |  | 43 | 44 | 45 | 46 | 47 |
| Isocyanate reactive group-containing resin (A) | Hydroxy group-containing resin (A1) | DESMOPHEN XP 2488 |  |  |  | 32 | 33 |
|  |  | DESMOPHEN VPLS 2249/1 | 32 |  |  |  |  |
|  |  | URIC F-97 |  | 32 |  |  |  |
|  | Amino group-containing resin (A2) | DESMOPHEN NH1420 |  |  |  |  | 32 |
|  |  | DESMOPHEN NH1220 |  |  |  |  |  |
| Polyisocyanate compound (B) | SUMIDUR N3300 |  | 61 | 61 |  |  | 61 |
|  | DESMODUR N3400 |  |  |  | 61 |  |  |
|  | DESMODUR N3900 |  |  |  |  | 60 |  |
| Hydroxy group-containing aromatic compound (C) | Benzyl alcohol |  |  |  |  |  |  |
|  | 2-Phenylethanol |  |  |  |  |  |  |
|  | 2-Phenoxyethanol |  |  |  |  |  |  |
|  | Naphthalene-1-ol |  |  |  |  |  |  |
|  | (1,3-Benzooxole-5-yl)methanol |  |  |  |  |  |  |
|  | 4-Nonylphenol |  |  |  |  |  |  |
|  | TERGITOL NP-9 Surfactant |  |  |  |  |  |  |
|  | ADEKA Polyether BPX-11 |  |  |  |  |  |  |
|  | ADEKA Polyether BPX-33 |  |  |  |  |  |  |
|  | ADEKA Polyether BPX-55 |  |  |  |  |  |  |
|  | ANTAGE SP |  | 3 | 3 | 3 | 3 | 3 |
| Internal mold release agent (D) | RIKEMAL TG-12 |  | 1 | 1 | 1 | 1 | 1 |
|  | BYK-P9065 |  |  |  |  |  |  |
|  | INT-120IMC |  |  |  |  |  |  |
|  | Zinc stearate GF-200 |  |  |  |  |  |  |
| Comparison component for (C) | Ortho-xylene |  |  |  |  |  |  |
|  | Naphthalene |  |  |  |  |  |  |
|  | 2-(2-Butoxyethoxy)ethanol |  |  |  |  |  |  |
|  | Cyclohexanol |  |  |  |  |  |  |
|  | 2,6-Dimethyl-4-heptanone |  |  |  |  |  |  |
|  | ADEKA Polyether BPX-2000 |  |  |  |  |  |  |
| Surface control agent | BYK-333 |  | 0.4 | 0.4 | 0.4 | 0.4 | 0.4 |
| Ultraviolet absorber | TINUVIN 400 |  | 1 | 1 | 1 | 1 | 1 |
| Light stabilizer | TINUVIN 292 |  | 1 | 1 | 1 | 1 | 1 |
| Catalyst | NEOSTANN U-100 |  | 0.6 | 0.6 | 0.6 | 0.6 | 0.6 |
|  | Total |  | 100 | 100 | 100 | 100 | 100 |
|  | Solid content (%) |  | 99 | 99 | 99 | 99 | 99 |
|  | Viscosity (25° C./mPa · s) |  | 6000 | 6500 | 4500 | 6000 | 2400 |

TABLE 3-3-continued

|  |  | Example | | | | |
|---|---|---|---|---|---|---|
|  |  | 58 | 59 | 60 | 61 | 62 |
| Features of (C) and comparison component for (C) | Molecular weight | 198, 302, 406 | 198, 302, 406 | 198, 302, 406 | 198, 302, 406 | 198, 302, 406 |
| | Number of hydroxy groups | 1 | 1 | 1 | 1 | 1 |
| | Number of aromatic ring structures | 2, 3, 4 | 2, 3, 4 | 2, 3, 4 | 2, 3, 4 | 2, 3, 4 |

TABLE 3-4

| | | | Example | | | | | |
|---|---|---|---|---|---|---|---|---|
| | | | 63 | 64 | 65 | 66 | 67 | 68 |
| | Coating composition No. | | 48 | 49 | 50 | 51 | 52 | 53 |
| Isocyanate reactive group-containing resin (A) | Hydroxy group-containing resin (A1) | DESMOPHEN XP 2488 | | | | | | 22 |
| | | DESMOPHEN VPLS 2249/1 | | | | | | |
| | | URIC F-97 | | | | | | |
| | Amino group-containing resin (A2) | DESMOPHEN NH1420 | 32 | 32 | 32 | 32 | | |
| | | DESMOPHEN NH1220 | | | | | 32 | 10 |
| Polyisocyanate compound (B) | | SUMIDUR N3300 | 61 | 61 | 61 | 61 | 61 | 61 |
| | | DESMODUR N3400 | | | | | | |
| | | DESMODUR N3900 | | | | | | |
| Hydroxy group-containing aromatic compound (C) | | Benzyl alcohol | 3 | | | | | |
| | | 2-Phenylethanol | | | | | | |
| | | 2-Phenoxyethanol | | | | | | |
| | | Naphthalene-1-ol | | 3 | | | | |
| | | (1,3-Benzooxole-5-yl)methanol | | | 3 | | | |
| | | 4-Nonylphenol | | | | | | |
| | | TERGITOL NP-9 Surfactant | | | | | | |
| | | ADEKA Polyether BPX-11 | | | | | | |
| | | ADEKA Polyether BPX-33 | | | | 3 | | |
| | | ADEKA Polyether BPX-55 | | | | | | |
| | | ANTAGE SP | | | | | 3 | 3 |
| Internal mold release agent (D) | | RIKEMAL TG-12 | 1 | 1 | 1 | 1 | 1 | 1 |
| | | BYK-P9065 | | | | | | |
| | | INT-120IMC | | | | | | |
| | | Zinc stearate GF-200 | | | | | | |
| Comparison component for (C) | | Ortho-xylene | | | | | | |
| | | Naphthalene | | | | | | |
| | | 2-(2-Butoxyethoxy)ethanol | | | | | | |
| | | Cyclohexanol | | | | | | |
| | | 2,6-Dimethyl-4-heptanone | | | | | | |
| | | ADEKA Polyether BPX-2000 | | | | | | |
| Surface control agent | | BYK-333 | 0.4 | 0.4 | 0.4 | 0.4 | 0.4 | 0.4 |
| Ultraviolet absorber | | TINUVIN 400 | 1 | 1 | 1 | 1 | 1 | 1 |
| Light stabilizer | | TINUVIN 292 | 1 | 1 | 1 | 1 | 1 | 1 |
| Catalyst | | NEOSTANN U-100 | 0.6 | 0.6 | 0.6 | 0.6 | 0.6 | 0.6 |
| | Total | | 100 | 100 | 100 | 100 | 100 | 100 |
| | Solid content (%) | | 99 | 99 | 99 | 99 | 99 | 99 |
| | Viscosity (25° C./mPa · s) | | 2200 | 2500 | 2500 | 2700 | 500 | 2000 |
| Features of (C) and comparison component for (C) | Molecular weight | | 108 | 144 | 152 | ~580 | 198, 302, 406 | 198, 302, 406 |
| | Number of hydroxy groups | | 1 | 1 | 1 | 2 | 1 | 1 |
| | Number of aromatic ring structures | | 1 | 2 | 1 | 2 | 2, 3, 4 | 2, 3, 4 |

TABLE 3-5

| | | | Example | | | | |
|---|---|---|---|---|---|---|---|
| | | | 69 | 70 | 71 | 72 | 73 |
| | Coating composition No. | | 54 | 55 | 56 | 57 | 58 |
| Isocyanate reactive group-containing resin (A) | Hydroxy group-containing resin (A1) | DESMOPHEN XP 2488 | 32 | 32 | 32 | 32 | 33 |
| | | DESMOPHEN VPLS 2249/1 | | | | | |
| | | URIC F-97 | | | | | |
| | Amino group-containing resin (A2) | DESMOPHEN NH1420 | | | | | |
| | | DESMOPHEN NH1220 | | | | | |

TABLE 3-5-continued

| | | Example | | | | |
|---|---|---|---|---|---|---|
| | | 69 | 70 | 71 | 72 | 73 |
| Polyisocyanate compound (B) | SUMIDUR N3300 | 61 | 61 | 61 | 62 | 63 |
| | DESMODUR N3400 | | | | | |
| | DESMODUR N3900 | | | | | |
| Hydroxy group-containing aromatic compound (C) | Benzyl alcohol | | | | | |
| | 2-Phenylethanol | | | | | |
| | 2-Phenoxyethanol | | | | | |
| | Naphthalene-1-ol | | | | | |
| | (1,3-Benzooxole-5-yl)methanol | | | | | |
| | 4-Nonylphenol | | | | | |
| | TERGITOL NP-9 Surfactant | | | | | |
| | ADEKA Polyether BPX-11 | | | | | |
| | ADEKA Polyether BPX-33 | | | | | |
| | ADEKA Polyether BPX-55 | | | | | |
| | ANTAGE SP | 3 | 3 | 3 | 3 | 3 |
| Internal mold release agent (D) | RIKEMAL TG-12 | | | | | 1 |
| | BYK-P9065 | 1 | | | | |
| | INT-120IMC | | 1 | | | |
| | Zinc stearate GF-200 | | | 1 | 1 | |
| Comparison component for (C) | Ortho-xylene | | | | | |
| | Naphthalene | | | | | |
| | 2-(2-Butoxyethoxy)ethanol | | | | | |
| | Cyclohexanol | | | | | |
| | 2,6-Dimethyl-4-heptanone | | | | | |
| | ADEKA Polyether BPX-2000 | | | | | |
| Surface control agent | BYK-333 | 0.4 | 0.4 | 0.4 | 0.4 | |
| Ultraviolet absorber | TINUVIN 400 | 1 | 1 | 1 | 1 | |
| Light stabilizer | TINUVIN 292 | 1 | 1 | 1 | 1 | |
| Catalyst | NEOSTANN U-100 | 0.6 | 0.6 | 0.6 | 0.6 | |
| | Total | 100 | 100 | 100 | 100 | 100 |
| | Solid content (%) | 99 | 99 | 99 | 99 | 99 |
| | Viscosity (25° C./mPa · s) | 5000 | 5000 | 5000 | 5000 | 2000 |
| Features of (C) and comparison component for (C) | Molecular weight | 198, 302, 406 | 198, 302, 406 | 198, 302, 406 | 198, 302, 406 | 198, 302, 406 |
| | Number of hydroxy groups | 1 | 1 | 1 | 1 | 1 |
| | Number of aromatic ring structures | 2, 3, 4 | 2, 3, 4 | 2, 3, 4 | 2, 3, 4 | 2, 3, 4 |

TABLE 3-6

| | | Comparative Example | | | | | | | |
|---|---|---|---|---|---|---|---|---|---|
| | | 17 | 18 | 19 | 20 | 21 | 22 | 23 | 24 |
| | Coating composition No. | 59 | 60 | 61 | 62 | 63 | 64 | 65 | 66 |
| Isocyanate reactive group-containing resin (A) | Hydroxy group-containing resin (A1) — DESMOPHEN XP 2488 | 32 | 32 | 32 | 32 | 32 | 32 | 33 | |
| | DESMOPHEN VPLS 2249/1 | | | | | | | | |
| | URIC F-97 | | | | | | | | |
| | Amino group-containing resin (A2) — DESMOPHEN NH1420 | | | | | | | | 33 |
| | DESMOPHEN NH1220 | | | | | | | | |
| Polyisocyanate compound (B) | SUMIDUR N3300 | 61 | 61 | 61 | 61 | 61 | 61 | 63 | 63 |
| | DESMODUR N3400 | | | | | | | | |
| | DESMODUR N3900 | | | | | | | | |
| Hydroxy group-containing aromatic compound (C) | Benzyl alcohol | | | | | | | | |
| | 2-Phenylethanol | | | | | | | | |
| | 2-Phenoxyethanol | | | | | | | | |
| | Naphthalene-1-ol | | | | | | | | |
| | (1,3-Benzooxole-5-yl)methanol | | | | | | | | |
| | 4-Nonylphenol | | | | | | | | |
| | TERGITOL NP-9 Surfactant | | | | | | | | |
| | ADEKA Polyether BPX-11 | | | | | | | | |
| | ADEKA Polyether BPX-33 | | | | | | | | |
| | ADEKA Polyether BPX-55 | | | | | | | | |
| | ANTAGE SP | | | | | | | | |
| Internal mold release agent (D) | RIKEMAL TG-12 | 1 | 1 | 1 | 1 | 1 | 1 | 1 | 1 |
| | BYK-P9065 | | | | | | | | |
| | INT-120IMC | | | | | | | | |
| | Zinc stearate GF-200 | | | | | | | | |

TABLE 3-6-continued

| | | Comparative Example | | | | | | | |
|---|---|---|---|---|---|---|---|---|---|
| | | 17 | 18 | 19 | 20 | 21 | 22 | 23 | 24 |
| Comparison component for (C) | Ortho-xylene | 3 | | | | | | | |
| | Naphthalene | | 3 | | | | | | |
| | 2-(2-Butoxyethoxy)ethanol | | | 3 | | | | | |
| | Cyclohexanol | | | | 3 | | | | |
| | 2,6-Dimethyl-4-heptanone | | | | | 3 | | | |
| | ADEKA Polyether BPX-2000 | | | | | | 3 | | |
| Surface control agent | BYK-333 | 0.4 | 0.4 | 0.4 | 0.4 | 0.4 | 0.4 | 0.4 | 0.4 |
| Ultraviolet absorber | TINUVIN 400 | 1 | 1 | 1 | 1 | 1 | 1 | 1 | 1 |
| Light stabilizer | TINUVIN 292 | 1 | 1 | 1 | 1 | 1 | 1 | 1 | 1 |
| Catalyst | NEOSTANN U-100 | 0.6 | 0.6 | 0.6 | 0.6 | 0.6 | 0.6 | 0.6 | 0.6 |
| | Total | 100 | 100 | 100 | 100 | 100 | 100 | 100 | 100 |
| | Solid content (%) | 97 | 97 | 97 | 97 | 97 | 100 | 100 | 100 |
| | Viscosity (25° C./mPa · s) | 3900 | 3900 | 3900 | 3900 | 3900 | 15,000 | 6500 | 2500 |
| Features of (C) and comparison component for (C) | Molecular weight | 106 | 128 | 162 | 100 | 142 | ~2000 | — | — |
| | Number of hydroxy groups | 0 | 0 | 1 | 1 | 0 | 2 | — | — |
| | Number of aromatic ring structures | 1 | 2 | 0 | 0 | 0 | 2 | — | — |

Fabrication of In-Mold Coating Molded Articles

Example 74

(Fabrication of In-Mold Coating Molded Article (M1))

First, "UMG ABS PS-507" (ABS resin, trade name of Techno-UMG Co., Ltd.) was filled into an injection molding cylinder and hot melted at 230° C. After injection into a mold at 60° C., the pressure was held for 30 seconds and the mold was cooled to obtain an acrylonitrile-butadiene-styrene resin (ABS resin) molded article. The mold was then temporarily opened, and coating composition No. 32 obtained in Example 47 was injected between the obtained ABS resin molded article and the mold and heated to 100° C. in the mold, maintaining the temperature while applying a molding pressure of 4 MPa and holding it for 1 minute, after which the pressure was reduced and the mold was opened, to fabricate an in-mold coating molded article (M1-1) having a coating film with a 100 μm cured film thickness formed on the ABS resin molded article.

(Fabrication of In-Mold Coating Molded Article (M2))

"IUPILON ML300" (polycarbonate resin, trade name of Mitsubishi Engineering-Plastics Corp.) was filled into an injection molding cylinder and hot melted at 280° C. After injection into a mold at 90° C., the pressure was held for 30 seconds and the mold was cooled to obtain a polycarbonate resin molded article. The mold was then temporarily opened, and coating composition No. 32 obtained in Example 47 was injected between the obtained polycarbonate resin molded article and the mold and heated to 100° C. in the mold, maintaining the temperature while applying a molding pressure of 4 MPa and holding it for 1 minute, after which the pressure was reduced and the mold was opened, to fabricate an in-mold coating molded article (M2-1) having a coating film with a 100 μm cured film thickness formed on the polycarbonate resin molded article.

Examples 75 to 100 and Comparative Examples 25 to 32

In-mold coating molded articles (M1-2) to (M1-35) and (M2-2) to (M2-35) were fabricated in the same manner as Example 74, except that the type of coating composition in Example 74 was as shown in Table 4-1 to Table 4-6.

Evaluation of In-Mold Coating Molded Articles

The cured coating films on the obtained in-mold coating molded articles were each evaluated for adhesiveness, gloss, pencil hardness, popping resistance and releasability. The evaluation results are shown in Table 4-1 to Table 4-6.

(Adhesiveness)

Following the procedure specified by JIS K 5600-5-6 (1990), a grid pattern of 2 mm×2 mm 100-squares was formed on the coating surface of in-mold coating molded article (M1) and in-mold coating molded article (M2), adhesive tape was attached to the surface, and after abruptly peeling it off, the state of the remaining square grid coating film was examined and the initial adhesiveness was evaluated on the following scale. Scores of VG and G are acceptable.

VG: 100 squares remaining on the square grid coating film, no edge chipping,

G: 100 squares remaining on the square grid coating film, but with edge chipping, P: 99 or fewer squares remaining on square grid coating film.

Each in-mold coating molded article was immersed for 240 hours in hot water at 40° C. and then raised up and dried for 12 hours at 20° C., after which a grid pattern of 2 mm×2 mm 100-squares was formed on the coated surface according to JIS K 5600-5-6(1990), adhesive tape was attached to the surface and abruptly peeled off, and the state of the remaining square grid coating film was examined and the adhesiveness after water resistance testing was evaluated on the following scale. Scores of VG and G are acceptable.

VG: 100 squares remaining on the square grid coating film, no edge chipping,

G: 100 squares remaining on the square grid coating film, but with edge chipping, P: 99 or fewer squares remaining on square grid coating film.

(Gloss)

The 60° gloss value of the obtained in-mold coating molded article (M1) was measured using a gloss meter (micro-TRI-gloss, BYK-Gardner), and the gloss was evaluated on the following scale. Scores of VG and G are acceptable.

VG: 60° gloss of ≥90,

G:: 60° gloss of ≥85 and ≥90,

P: 60° gloss of <85.

(Pencil Hardness)

The pencil hardness of the coating surface of the in-mold coating molded article (M1) was measured according to JIS K 5600-5-4(1999), "Scratch hardness (pencil method)". The pencil hardness is evaluated in the order: 3B<2B<B<HB<F<H, with a pencil hardness of HB or greater considered acceptable.

(Popping Resistance)

The in-mold coating molded article (M1) was visually observed and the number of pops in the range of 100 mm length×100 mm width occurring on the in-mold coating molded article was counted, evaluating the popping resistance on the following scale. Scores of VG and G are acceptable.
- VG: No pops found on in-mold coating molded article,
- G: 1 to 3 pops found on in-mold coating molded article,
- P: 4 or more pops found on in-mold coating molded article.

(Releasability)

When opening the mold during fabrication of the in-mold coating molded article (M1), the mold on the coating film side was lifted up and it was observed whether the in-mold coating molded article (M1) was removed from the mold on the coating film side by gravity alone. When the in-mold coating molded article (M1) was removed from the mold by gravity alone, the in-mold coating molded article (M1) was visually examined and the number of detached points of the coating film were counted, evaluating the releasability on the following scale. Scores of VG and G are acceptable.
- VG: In-mold coating molded article was removed from mold by gravity alone, with 0 to 1 detached points,
- G: In-mold coating molded article was removed from mold by gravity alone, with 2 to 4 detached points,
- P: In-mold coating molded article was not removed from mold by gravity alone, or in-mold coating molded article was removed from mold by gravity alone with 5 or more detached points.

TABLE 4-1

|  |  |  | Example | | | | |
| --- | --- | --- | --- | --- | --- | --- | --- |
|  |  |  | 74 | 75 | 76 | 77 | 78 |
|  | Coating composition No. |  | 32 | 33 | 34 | 35 | 36 |
|  | Solid content (%) |  | 99 | 99 | 99 | 99 | 99 |
|  | Viscosity (25° C./mPa · s) |  | 4000 | 4000 | 4200 | 5500 | 5700 |
| Features of (C) and comparison component for (C) Evaluation | Molecular weight |  | 108 | 122 | 138 | 144 | 152 |
|  | Number of hydroxy groups |  | 1 | 1 | 1 | 1 | 1 |
|  | Number of aromatic ring structures |  | 1 | 1 | 1 | 2 | 1 |
|  | In-mold coating molded article (M1) | In-mold coating molded article name | (M1-1) | (M1-2) | (M1-3) | (M1-4) | (M1-5) |
|  |  | Initial adhesiveness | VG | G | G | VG | VG |
|  |  | Adhesiveness after water resistance testing | G | G | G | VG | G |
|  |  | Gloss | G | G | G | VG | G |
|  |  | Pencil hardness | HB | HB | HB | HB | F |
|  |  | Popping resistance | G | G | G | VG | VG |
|  |  | Releasability | VG | VG | VG | VG | VG |
|  | In-mold coating molded article (M2) | In-mold coating molded article name | (M2-1) | (M2-2) | (M2-3) | (M2-4) | (M2-5) |
|  |  | Initial adhesiveness | G | G | G | G | G |
|  |  | Adhesiveness after water resistance testing | G | G | G | G | G |

TABLE 4-2

|  |  |  | Example | | | | | |
| --- | --- | --- | --- | --- | --- | --- | --- | --- |
|  |  |  | 79 | 80 | 81 | 82 | 83 | 84 |
|  | Coating composition No. |  | 37 | 38 | 39 | 40 | 41 | 42 |
|  | Solid content (%) |  | 99 | 100 | 99 | 100 | 100 | 99 |
|  | Viscosity (25° C./mPa · s) |  | 5500 | 5400 | 6000 | 6100 | 6200 | 5000 |
| Features of (C) and comparison component for (C) Evaluation | Molecular weight |  | 220 | 616 | ~360 | ~580 | ~790 | 198, 302, 406 |
|  | Number of hydroxy groups |  | 1 | 1 | 2 | 2 | 2 | 1 |
|  | Number of aromatic ring structures |  | 1 | 1 | 2 | 2 | 2 | 2, 3, 4 |
|  | In-mold coating molded article (M1) | In-mold coating molded article name | (M1-6) | (M1-7) | (M1-8) | (M1-9) | (M1-10) | (M1-11) |
|  |  | Initial adhesiveness | G | G | VG | VG | VG | VG |
|  |  | Adhesiveness after water resistance testing | G | VG | VG | VG | VG | VG |
|  |  | Gloss | VG | G | VG | VG | VG | VG |
|  |  | Pencil hardness | HB | HB | HB | HB | HB | F |
|  |  | Popping resistance | G | G | VG | VG | VG | VG |
|  |  | Releasability | VG | VG | VG | VG | VG | VG |
|  | In-mold coating molded article (M2) | In-mold coating molded article name | (M2-6) | (M2-7) | (M2-8) | (M2-9) | (M2-10) | (M2-11) |
|  |  | Initial adhesiveness | G | G | VG | VG | VG | G |
|  |  | Adhesiveness after water resistance testing | G | G | VG | VG | VG | G |

TABLE 4-3

|  |  |  | Example | | | | |
|---|---|---|---|---|---|---|---|
|  |  |  | 85 | 86 | 87 | 88 | 89 |
|  | Coating composition No. | | 43 | 44 | 45 | 46 | 47 |
|  | Solid content (%) | | 99 | 99 | 99 | 99 | 99 |
|  | Viscosity (25° C./mPa · s) | | 6000 | 6500 | 4500 | 6000 | 2400 |
| Features of (C) and comparison component for (C) | Molecular weight | | 198, 302, 406 | 198, 302, 406 | 198, 302, 406 | 198, 302, 406 | 198, 302, 406 |
|  | Number of hydroxy groups | | 1 | 1 | 1 | 1 | 1 |
|  | Number of aromatic ring structures | | 2, 3, 4 | 2, 3, 4 | 2, 3, 4 | 2, 3, 4 | 2, 3, 4 |
| Evaluation | In-mold coating molded article (M1) | In-mold coating molded article name | (M1-12) | (M1-13) | (M1-14) | (M1-15) | (M1-16) |
|  |  | Initial adhesiveness | VG | VG | VG | VG | VG |
|  |  | Adhesiveness after water resistance testing | VG | VG | VG | VG | VG |
|  |  | Gloss | VG | VG | VG | VG | VG |
|  |  | Pencil hardness | F | F | HB | HB | F |
|  |  | Popping resistance | G | G | G | G | G |
|  |  | Releasability | VG | VG | VG | VG | VG |
|  | In-mold coating molded article (M2) | In-mold coating molded article name | (M2-12) | (M2-13) | (M2-14) | (M2-15) | (M2-16) |
|  |  | Initial adhesiveness | G | G | G | G | G |
|  |  | Adhesiveness after water resistance testing | G | G | G | G | G |

TABLE 4-4

|  |  |  | Example | | | | | |
|---|---|---|---|---|---|---|---|---|
|  |  |  | 90 | 91 | 92 | 93 | 94 | 95 |
|  | Coating composition No. | | 48 | 49 | 50 | 51 | 52 | 53 |
|  | Solid content (%) | | 99 | 99 | 99 | 99 | 99 | 99 |
|  | Viscosity (25° C./mPa · s) | | 2200 | 2500 | 2500 | 2700 | 500 | 2000 |
| Features of (C) and comparison component for (C) | Molecular weight | | 108 | 144 | 152 | ~580 | 198, 302, 406 | 198, 302, 406 |
|  | Number of hydroxy groups | | 1 | 1 | 1 | 2 | 1 | 1 |
|  | Number of aromatic ring structures | | 1 | 2 | 1 | 2 | 2, 3, 4 | 2, 3, 4 |
| Evaluation | In-mold coating molded article (M1) | In-mold coating molded article name | (M1-17) | (M1-18) | (M1-19) | (M1-20) | (M1-21) | (M1-22) |
|  |  | Initial adhesiveness | VG | VG | VG | VG | VG | VG |
|  |  | Adhesiveness after water resistance testing | VG | VG | VG | VG | VG | VG |
|  |  | Gloss | G | VG | G | VG | VG | VG |
|  |  | Pencil hardness | F | HB | HB | F | F | HB |
|  |  | Popping resistance | G | G | G | G | G | G |
|  |  | Releasability | VG | VG | VG | VG | VG | VG |
|  | In-mold coating molded article (M2) | In-mold coating molded article name | (M2-17) | (M2-18) | (M2-19) | (M2-20) | (M2-21) | (M2-22) |
|  |  | Initial adhesiveness | G | G | G | VG | G | G |
|  |  | Adhesiveness after water resistance testing | G | G | G | VG | G | G |

TABLE 4-5

|  |  |  | Example | | | | |
|---|---|---|---|---|---|---|---|
|  |  |  | 96 | 97 | 98 | 99 | 100 |
|  | Coating composition No. | | 54 | 55 | 56 | 57 | 58 |
|  | Solid content (%) | | 99 | 99 | 99 | 99 | 99 |
|  | Viscosity (25° C./mPa · s) | | 5000 | 5000 | 5000 | 5000 | 2000 |
| Features of (C) and comparison component for (C) | Molecular weight | | 198, 302, 406 | 198, 302, 406 | 198, 302, 406 | 198, 302, 406 | 198, 302, 406 |
|  | Number of hydroxy groups | | 1 | 1 | 1 | 1 | 1 |
|  | Number of aromatic ring structures | | 2, 3, 4 | 2, 3, 4 | 2, 3, 4 | 2, 3, 4 | 2, 3, 4 |

TABLE 4-5-continued

|  |  |  | Example | | | | |
|---|---|---|---|---|---|---|---|
|  |  |  | 96 | 97 | 98 | 99 | 100 |
| Evaluation | In-mold coating molded article (M1) | In-mold coating molded article name | (M1-23) | (M1-24) | (M1-25) | (M1-26) | (M1-27) |
|  |  | Initial adhesiveness | VG | VG | G | VG | VG |
|  |  | Adhesiveness after water resistance testing | VG | VG | G | VG | G |
|  |  | Gloss | VG | VG | VG | VG | VG |
|  |  | Pencil hardness | F | F | HB | F | HB |
|  |  | Popping resistance | VG | VG | G | VG | G |
|  |  | Releasability | VG | VG | G | P | VG |
|  | In-mold coating molded article (M2) | In-mold coating molded article name | (M2-23) | (M2-24) | (M2-25) | (M2-26) | (M2-27) |
|  |  | Initial adhesiveness | G | G | G | G | G |
|  |  | Adhesiveness after water resistance testing | G | G | G | G | G |

TABLE 4-6

|  |  |  | Comparative Example | | | | | | | |
|---|---|---|---|---|---|---|---|---|---|---|
|  |  |  | 25 | 26 | 27 | 28 | 29 | 30 | 31 | 32 |
| Coating composition No. | | | 59 | 60 | 61 | 62 | 63 | 64 | 65 | 66 |
| Solid content (%) | | | 97 | 97 | 97 | 97 | 97 | 100 | 100 | 100 |
| Viscosity (25° C./mPa · s) | | | 3900 | 3900 | 3900 | 3900 | 3900 | 15,000 | 6500 | 2500 |
| Features of (C) and comparison component for (C) | Molecular weight | | 106 | 128 | 162 | 100 | 142 | ~2000 | — | — |
|  | Number of hydroxy groups | | 0 | 0 | 1 | 1 | 0 | 2 | — | — |
|  | Number of aromatic ring structures | | 1 | 2 | 0 | 0 | 0 | 2 | — | — |
| Evaluation | In-mold coating molded article (M1) | In-mold coating molded article name | (M1-28) | (M1-29) | (M1-30) | (M1-31) | (M1-32) | (M1-33) | (M1-34) | (M1-35) |
|  |  | Initial adhesiveness | P | P | P | P | P | P | P | P |
|  |  | Adhesiveness after water resistance testing | P | P | P | P | P | P | P | P |
|  |  | Gloss | P | G | G | P | P | G | G | G |
|  |  | Pencil hardness | B | B | B | B | B | B | HB | HB |
|  |  | Popping resistance | P | P | P | P | P | G | G | G |
|  |  | Releasability | VG | VG | VG | VG | VG | VG | VG | VG |
|  | In-mold coating molded article (M2) | In-mold coating molded article name | (M2-28) | (M2-29) | (M2-30) | (M2-31) | (M2-32) | (M2-33) | (M2-34) | (M2-35) |
|  |  | Initial adhesiveness | P | P | P | P | P | P | P | P |
|  |  | Adhesiveness after water resistance testing | P | P | P | P | P | P | P | P |

The invention claimed is:

1. A coating composition comprising: an isocyanate reactive group-containing resin (A); a polyisocyanate compound (B); and a hydroxy group-containing aromatic compound (C) having a number-average molecular weight in the range of 100 to 1000, wherein a solid content of the coating composition is 95 mass % or greater.

2. The coating composition according to claim 1, wherein the isocyanate reactive group-containing resin (A) comprises one or more resins selected from among hydroxy group-containing resins (A1) and amino group-containing resins (A2).

3. The coating composition according to claim 1, wherein the number-average molecular weight of the hydroxy group-containing aromatic compound (C) is in the range of 140 to 900.

4. The coating composition according to claim 1, wherein the hydroxy group-containing aromatic compound (C) has one hydroxy group.

5. The coating composition according to claim 1, wherein the hydroxy group-containing aromatic compound (C) has 2 to 4 aromatic ring structures.

6. The coating composition according to claim 1, which further includes an internal mold release agent (D).

7. An in-mold coating method that includes a step of heating and molding a resin material in a mold, subsequently injecting an in-mold coating composition between the obtained molded article and the mold inner wall and curing the in-mold coating composition, and then removing the coated molded article from the mold, wherein the in-mold coating composition is a coating composition according to claim 1.

* * * * *